(12) United States Patent
Washizu

(10) Patent No.: US 6,839,175 B2
(45) Date of Patent: Jan. 4, 2005

(54) IMAGE FORMING ELEMENT AND IMAGE FORMING DEVICE

(75) Inventor: Shintaro Washizu, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/103,829

(22) Filed: Mar. 25, 2002

(65) Prior Publication Data

US 2003/0017263 A1 Jan. 23, 2003

(30) Foreign Application Priority Data

Mar. 23, 2001 (JP) ........................................ 2001-086313

(51) Int. Cl.$^7$ ............................. G02B 5/20; G02F 1/21; G02F 1/23
(52) U.S. Cl. ....................... 359/584; 359/587; 359/589; 359/242; 359/244
(58) Field of Search ................................ 359/580, 584, 359/586, 587, 589, 241, 242, 244

(56) References Cited

U.S. PATENT DOCUMENTS

| | | | | |
|---|---|---|---|---|
| 4,592,980 A | * | 6/1986 | Tomida et al. | 430/59.1 |
| 4,796,981 A | * | 1/1989 | Nishimura et al. | 359/289 |
| 4,819,239 A | * | 4/1989 | Sharp et al. | 372/12 |
| 4,828,917 A | * | 5/1989 | Wegner et al. | 428/333 |
| 5,246,748 A | * | 9/1993 | Gillberg-Laforce et al. | 428/1.2 |
| 5,759,447 A | * | 6/1998 | Efron et al. | 252/582 |
| 6,124,963 A | * | 9/2000 | Schumaker | 359/245 |
| 6,400,489 B1 | * | 6/2002 | Suzuki et al. | 359/241 |
| 2003/0179381 A1 | * | 9/2003 | Kinoshita et al. | 356/450 |

OTHER PUBLICATIONS

Robert J. Collier, et al, "Optical Holography", Chapter 9, §§ 9.1 & 9.2, pp. 228–233. Academic Press, New York, © 1971.*

Thomas M. Cooper, et al., "Formation of Polypeptide–Dye Multilayers by an Electrostatic Self–Assembly Technique", LANGMUIR 1995, vol. 11, No. 7, pp. 2173–2178.*

Munekazu Date, et al., "52.3: Direct–viewing Display Using Alignment–controlled PDLC and Holographic PDLC", SID 00 Digest, pp. 1184–1187.*

Kinoshita, Takatoshi, Department of Engineering, Nagoya Institute of Technology, Control of Superfine Structure of Membrane and Their Characterization, *Polymer*, vol. 50, Sep. 2001, pp. 648–651.

(List continued on next page.)

Primary Examiner—John Juba, Jr.
(74) Attorney, Agent, or Firm—Sughrue Mion, PLLC

(57) ABSTRACT

An image forming element is disclosed which is easy to manufacture, which can form images easily and at a low cost, and which is stable without fear of environmental problems arising at a time of disposal. Also disclosed is an image forming device which utilizes the image forming element and which can form color images. The image forming element contains at least a film in which rod-shaped bodies are oriented and which reflects incident light as colored interference light. The image forming device is equipped with at least the image forming element, and an ability to irradiate light onto the image forming element. The image forming element reflects, as interference light, the irradiated light. The wavelength of the interference light is 300 to 810 nm.

11 Claims, 11 Drawing Sheets

OTHER PUBLICATIONS

Kawaguchi, Takeyuki, Shiro, Takashi; and Iwata, Kaoru, "A Device for Visual Detection of Antigens and Antibodies by Means of Light Interference", *Thin Solid Films*, vol. 191, (Elsevier Sequoia), 1990, pp. 369–381.

Tomokiyo Doi, Hidenori Yokoi, Yasuhiro Mouri and Taka-Toshi Kinoshita *the Control of Structure and Functions of LB–Film Composed of Bio–Related Polymers* First International Symposium on Biomimetie Materials Processing Jan. 11, 2001, Department of Materials Science and Engineering, Nagoya Institute of Technology, Gokiso–cho, Showa–ku, Nagoya 466–8555, Japan.

Takatoshi Kinoshita, *Preparation of a Structual Color Forming System by Polypeptide–Based LB Films*, Nagoya Institute of Technology, Gokiso–cho, Showa–ku Nagoya 466–8555, Japan (Mar. 14, 2001).

Hidenori Yokio, Takatoshi Kinoshita, Yoshiharu Tsujita, and Hiroaki Yoshimizu *Nano–Phase Separation in the Monolayer Composed of a–Helical Copolypeptide at Air/Water Interface* Department of Materials Science and Engineering, Nagoya Institute of Technology, Gokiso–cho, Showa–ku, Nagoya 466–8555, Japan (Received Jul. 13, 2000 CL–000671) Chemistry Letters 2000, pp 1210–1211, (c) Chemical Soc. Japan.

Hirofumi Hosokawa, Takatoshi Kinoshita, Yoshiharu Tsujita, and Hiroaki Yoshimizu *the Molecular Orientation of a Peptide–Based Amphiphile at Hexane/Water Interface* Department of Materials Science and Engineering, Nagoya Institute of Technology, Gokiso–cho, Showa–ku, Nagoya 466–8555, Japan (Received Apr. 9, 1997; CL 970264) Chemistry Letters 1997.

T. Kinoshita, T. Doi, A. Kato, H. Hosokawa, Y. Tsujita, and H. Yoshimuzu *the Guest–Induced Oscillation of a Monolayer Composed of Polypeptede Containing B–Cyclodextrin at the Terminal* Department of Materials Science and Engineering, Nagoya Institute of Technology, Gokiso–cho, Showa–ku, Nagoya 466–8555, Japan (Received Jun. 26, 1998; accepted for publication Jan. 19, 1999)Chaos Jun. 1999 vol. 9, No. 2.

Y. Mouri, T. Kinoshita, Y. Tsujita, and H: Yoshimuzu *the Molecular Recognition and Polypeptide Orientation in the Monolayer at Oil/Water interface* Department of Materials Science and Engineering, Nagoya Institute of Technology, Gokiso–Cho, Showa–ku, Nagoya 466–855, (Dec. 7, 2000).

Color Tone Control By External Stimuli, Nagoya Institute of Technology, Imitating Function of Bio–skins Applicable to Display Devices, *Nikkan Kogyo Shinbun*, Dec. 28, 2000, Japan.

T. Doi et al., Symposium: Building of Molecular Composition and Its Function, Building and control of peptide type signal transfer function, A506, Nagoya Institute of Technology, Symposium held by JST, Nov. 28, 2000, Japan.

H. Yokoi et al., Preparation of Amphiphilic α–helix LB film, *Polymer Preprints, Japan*. vol. 49 No. 12 IS07, Nagoya Institute of Technology, 2000, Society of Polymer Science, Japan.

H. Yokoi et al., Evaluation of molecular orientation of amphiphilic α–helix water surface monomolecular film, *Polymer Preprints, Japan*, vol. 49 No. 13 lip090, Nagoya Institute of Technology, 2000, Society of Polymer Science, Japan.

Y. Okahata, Sensing of Odorous and Bitter Substances by using a Bilayer Molecular Film–coated Quartz Oscillator, *Biophysics*, vol. 28. No. 6 Pandect, Tokyo Institute of Technology, 1988, Japan.

Y. Okahata, Prospect for Chemical Information Conversion Membrane, Molecular Recognition to be realized on a Lipid Bilayer Molecular Membrane, *SEN–I GAKKAISHI* (*Fiber and Industry*) vol. 46, No. 2 Feature: Functional Macromolecular Membranes Films, 1990, Japan.

K. Ariga et al., Evaluation of the Viscoelasticity of the Membrane with the Use of a Quartz Oscillator, Phase Transition of the LB film, vol. 28 No. 11, Tokyo Institute of Technology, 1990, Japan §§ 2.1–2.4.

H. Yokoi et al., *The 48th Symposium on Ma romolecules*, The Two Dimensional Orientation Control of Amphiphilic α–helix Molecule, II P f094, Nagoya Institute of Technology, Oct. 6, 1999, Niigata, Japan.

H. Yokoi et al., *The 49th Annual Meeting of the Society of Polymer Science, Japan* (*SPSJ*), The pH Dependence of Molecular Orientation in Monolayer Composed of Amphiphilic α–helix Molecule at Air–water Interface, I p. 173, Nagoya Institute of Technology, May 29, 2000, Nagoya, Japan.

H. Yokoi et al., *The 49th Symposium on Macromolecules*, Preparation of LB Film consisting of Amphiphilic α–helix Molecule, IS 07, Nagoya Institute of Technology, Sep. 27, 2000, Sendai, Japan.

H. Yokoi et al., *The 49th Symposium on Macromolecules*, Evaluation of molecular orientation of amphiphilic α–helix water surface monomolecular film, IIPd090, Nagoya Institute of Technology, Sep. 27, 2000, Sendai, Japan.

Y. Nagata, et al., *The 43rd Annual Meeting of the Society of Polymer Science, Japan* (*SPSI*), Preparation and Function of Polypeptide Containing a Substrate–binding Site at the Molecular Terminal, II–9–06, Nagoya Institute of Technology, and National Institute of Materials and Chemical Research, Tsukuba, May 26, 1994, Nagoya, Japan.

H. Hosokawa et al., *The 44th Annual Meeting of the Society of Polymer Science, Japan* (*SPSJ*), Functional Control of Polypeptide Containing an Inclusion Terminal Group, II Pel 119, May 30, 1995, Yokohama, Japan.

H. Hosokawa et al., Functional Control of Polypeptide Containing an Inclusion Terminal Group, Preprints of Annual meeting of the Society of Fiber Science and Technology, Japan, G–264 3G17, Jun. 29, 1995, Tokyo (Sen–I Gakkai).

H. Hosokawa et al., *45th Annual Meeting of Society of Polymer Science of Japan*, Monolayer of polypeptide containing a cyclodextrin at the terminal, IIIPb100, Nagoya Institute Technology, Nagoya and National Institute of Materials and Chemical Research, Tsukuba, May 29, 1996, Nagoya, Japan.

H. Hosokawa et al., *45th Symposium of Society of Polymer Science of Japan*, Molecular orientation of polypeptide containing a cyclodextrin at the terminal in the monolayer and its function, 2Pb44, Nagoya Institute of Technology, Oct. 2, 1996, Hiroshima, Japan.

H. Hosokawa et al., *46th Annual Meeting of Society of Polymer Science of Japan*, Structural control of polypeptide containing an active site at the terminal in monolayer and its function, IIPb108, Nagoya Institute of Technology, May 24, 1997, Tokyo, Japan.

A. Kato et al., *47th Annual Meeting of Society of Polymer Science of Japan*, Characterization of polypeptide monolayer containing the molecular recognition site, IIIPd124, Nagoya Institute of Technology, May 29, 1998, Kyoto, Japan.

A. Kato et al., *29th Annual Meeting of Union of Chemistry–Related Societies in Chubu Area, Japan*, Characterization of polypeptide monolayer containing a cyclodextrin at the terminal, 1B0705, Nagoya Institute of Technology, Oct. 3, 1998, Toyohashi, Japan.

H. Yokoi et al., The control of molecular orientation in monolayer of amphiphilic α–helix, *Preprints presented at 15th Symposium of Membrane Science and Technology*, 3PA53, Nagoya Institute of Technology and Core Research for Evolutional Science and Technology, May 12, 1999, Chiba, Japan (Sen–I Gakkai).

T. Doi et al., *48th Symposium of Society of Polymer Science of Japan*, The molecular orientation and oscillation of polypeptide monolayer at oil/water interface, 111J02, Nagoya Institute of Technology and Core Research for Evolutional Science and Technology, Oct. 8, 1999, Niigata, Japan.

T. Doi et al., *Open Symposium of Creation and Functions of New Molecules and Molecular Assemblies sponsored by Core Research for Evolutional Science and Technology (CREST)*, Creation of peptide–type signal transmitting function and control of its function, A506, Nagoya Institute of Technology, Nov. 28, 2000, at Japan Science and Technology Corporation (JST), Tokyo, Japan.

T. Doi, Molecular alignment of poly(γ–methyl–L–glutamate) containing a β–cyclodextrin at the terminal and molecular identification (n–hexane/water interface), *Control of molecular alignment of polypeptide molecular film* published by Dr. Tomokiyo Doi, chapter 4, 2000 section 4–3–3.

U.S. patent application Ser. No. 10/103,830, Fuji Photo Film Co., Ltd., filed Mar. 25, 2002.

U.S. patent application Ser. No. 10/103,832, Fuji Photo Film Co., Ltd., filed Mar. 25, 2002.

U.S. patent application Ser. No. 10/103,831, Fuji Photo Film Co., Ltd., filed Mar. 25, 2002.

U.S. patent application Ser. No. 10/103,757, Fuji Photo Film Co., Ltd., filed Mar. 25, 2002.

U.S. patent application Ser. No. 10/103,833, Fuji Photo Film Co., Ltd., filed Mar. 25, 2002.

U.S. patent application Ser. No. 10/103,884, Fuji Photo Film Co., Ltd., filed Mar. 25, 2002.

Takatoshi Kinoshita. "Preparation of a Structural Color Forming System by Polyeptide–Based LB Films"; *The fourth NIMC International Symposium on Photoreaction Control and Photofunctional Materials*. Mar. 14, 2001, Ibaragi, pp. 1–9 to 1–12.

Y. Mouri, et al. "The Molecular Recognition and Polypeptide Orientation in the Monolayer at Oil/Water Interface", *12th Academic Symposium of MRS–Japan manuscripts*, Dec. 7, 2000, p. 66.

\* cited by examiner

Visible Light Irradiation ⇅ UV Light Irradiation

IMAGE FORMING ELEMENT AND IMAGE FORMING DEVICE

BACKGROUND OF THE INVENTION

1. Field of the Invention

The present invention relates to an image forming element which reflects incident light as colored interference light, and to an image forming device utilizing the image forming element.

2. Description of the Related Art

Conventionally, various types of image forming elements and image forming devices using the image forming elements have been developed and provided. However, most of these image forming elements and image forming devices have problems such as the following. Because the image forming elements and image forming devices use dyes and/or pigments, polluting waste liquids are generated at the time of manufacture. Disposal of wastes is not easy, and there is the possibility that environmental problems may be caused. Also, with certain image forming elements and devices, the image forming mechanism is complex and Image formation is expensive. Recently, there has been a strong demand for the development of image forming elements and image forming devices which do not have such problems.

SUMMARY OF THE INVENTION

An object of the present invention is to provide an image forming element which overcomes the aforementioned problems of the prior art; which is easy to manufacture; which can form images easily and at a low cost, and which is stable without the fear of environmental problems arising at the time of disposal thereof. A further object is to provide an image forming device which utilizes the image forming element and which can form color images.

The image forming element of the present invention has at least a film in which rod-shaped bodies are oriented (preferably parallel to each other) and which reflects incident light as colored interference light.

The image forming device of the present invention comprises the image forming element of the present invention, and means for irradiating light onto the image forming element, and the image forming element which reflects, as interference light, light irradiated by the means for irradiating light, and the wavelength of the interference light is 300 to 810 nm.

DESCRIPTION OF THE PREFERRED EMBODIMENTS

Figure 1:
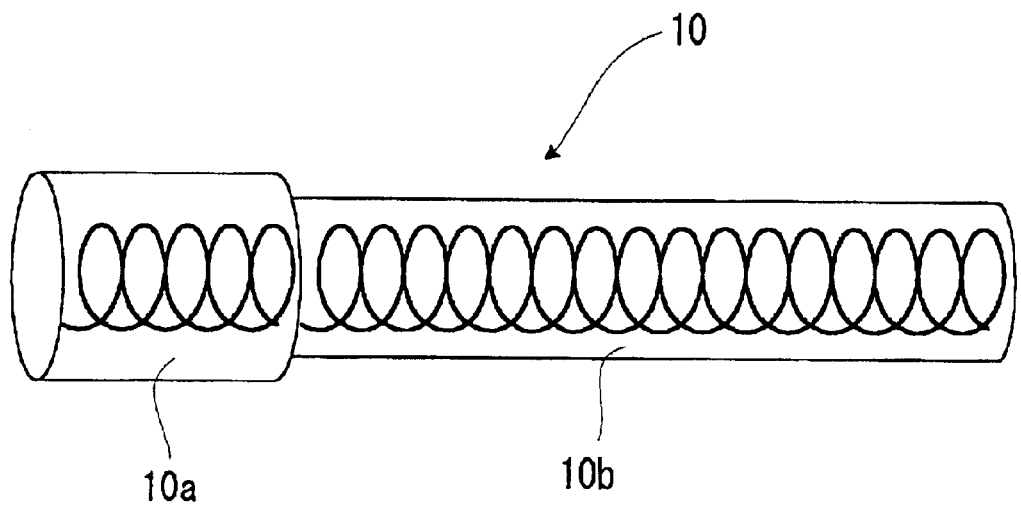
FIG. 1 is a schematic explanatory view illustrating an example of an amphiphilic rod-shaped body.

The image forming element and the image forming device of the present invention will be described in detail hereinafter.

{Image Forming Element}

The image forming element of the present invention has at least a film in which rod-shaped bodies are oriented (preferably parallel to each other) and which reflect incident light as colored interference light.

<Rod-Shaped Bodies>

The rod-shaped body is not particularly limited provided that it is rod-shaped, and may be appropriately selected in accordance with the object. The rod-shaped body may be either a rod-shaped inorganic substance or rod-shaped organic substance, but a rod-shaped organic substance is preferable.

Examples of rod-shaped organic substances are biopolymers, polysaccharides, and the like.

Suitable examples of biopolymers are fibrous proteins, α-helix polypeptides, nucleic acids (DNA, RNA), and the like. Examples of fibrous proteins are fibrous proteins having α-helix structures such as α-keratin, myosin, epidermin, fibrinogen, tropomyosin, silk fibroin, and the like. Suitable examples of polysaccharides are amylose and the like.

Among rod-shaped organic substances, spiral organic molecules whose molecules have a spiral structure are preferable from the standpoints that the rod shape can be maintained stably and that other substances can be intercalated into the interior of the molecule in accordance with the object. Among the aforementioned substances, those with spiral organic molecules include α-helix polypeptides, DNA, amylose, and the like.

{α-Helix Polypeptides}

α-helix polypeptides are one of secondary structures of polypeptides. The polypeptide rotates one time (forms one spiral) for each amino acid 3.6 residue, and a hydrogen bond, which is substantially parallel to the axis of the helix, is formed between a carbonyl group (—CO—) and an imide group (—NH—) of each fourth amino acid, and this structure is repeated in units of seven amino acids. In this way, the α-helix polypeptide has a structure which is stable energy-wise.

The direction of the spiral of the α-helix polypeptide is not particularly limited, and may be either wound right or wound left. Note that, in nature, only structures whose direction of spiral is wound right exist from the standpoint of stability.

The amino acids which form the α-helix polypeptide are not particularly limited provided that an α-helix structure can be formed, and can be appropriately selected in accordance with the object. However, amino acids which facilitate formation of the α-helix structure are preferable. Suitable examples of such amino acids are aspartic acid (Asp), glutamic acid (Glu), arginine (Arg), lysine (Lys), histidine (His), asparagine (Asn), glutamine (Gln), serine (Ser), threonine (Thr), alanine (Ala), valine (Val), leucine (Leu), isoleucine (Ile), cysteine (Cys), methionine (Met), tyrosine (Tyr), phenylalanine (Phe), tryptophan (Trp), and the like. A single one of these amino acids may be used alone, or two or more may be used in combination.

By appropriately selecting the amino acid, the property of the α-helix polypeptide can be changed to any of hydrophilic, hydrophobic, and amphiphilic. In the case in which the α-helix polypeptide is to be made to be hydrophilic, suitable examples of the amino acid are serine (Ser), threonine (Thr), aspartic acid (Asp), glutamic acid (Glu), arginine (Arg), lysine (Lys), asparagine (Asn), glutamine (Gln), and the like. In the case in which the α-helix polypeptide is to be made to be hydrophobic, suitable examples of the amino acid are phenylalanine (Phe), tryptophan (Trp), isoleucine (Ile), tyrosine (Tyr), methionine (Met), leucine (Leu), valine (Val), and the like.

In the α-helix polypeptide, the carboxyl group, which does not form a peptide bond and which is in the amino acid which forms the α-helix, can be made to be hydrophobic by esterification. On the other hand, an esterified carboxyl group can be made to be hydrophilic by hydrolysis.

The amino acid may be any of a L-amino acid, a D-amino acid, a derivative in which the side chain portion of a L-amino acid or a D-amino acid is modified, or the like.

The number of bonds (the degree of polymerization) of the amino acid in the α-helix polypeptide is not particularly limited and may be appropriately selected in accordance with the object. However, 10 to 5000 is preferable.

If the number of bonds (the degree of polymerization) is less than 10, it may not be possible for the polyamino acid to form a stable α-helix. If the number of bonds (the degree of polymerization) exceeds 5000, vertical orientation may be difficult to achieve.

Suitable specific examples of the α-helix polypeptide are polyglutamic acid derivatives such as poly(γ-methyl L-glutamate), poly(γethyl L-glutamate), poly(γ-benzyl L-glutamate), poly(n-hexyl L-glutamate), etc.; polyaspartic acid derivatives such as poly(β-benzyl L-aspartate) etc.; polypeptides such as poly(L-leucine), poly(L-alanine), poly (L-methionine), poly(L-phenylalanine), poly(L-lysine)-poly (γ-methyl L-glutamate), etc.

The α-helix polypeptide may be a commercially available α-helix polypeptide, or may be appropriately synthesized or prepared in accordance with methods disclosed in known publications, etc.

As one example of synthesizing the α-helix polypeptide, the synthesis of block copolypeptide [poly(L-lysine)$_{25}$-poly (γ-methyl L-glutamate)$_{60}$]PLLZ$_{25}$-PMLG$_{60}$ is as follows. As is shown by the following formula, block copolypeptide [poly(L-lysine)$_{25}$ poly(γ-methyl L-glutamate)$_{60}$]PLLZ$_{25}$-PMLG$_{60}$ can be synthesized by polymerizing N$^\epsilon$-carbobenzoxy L-lysine N$^\alpha$-carboxy acid anhydride (LLZ-NCA) by using n-hexylamine as an initiator, and then polymerizing γ-methyl L-glutamate N-carboxy acid anhydride (MLG-NCA).

Formula 1

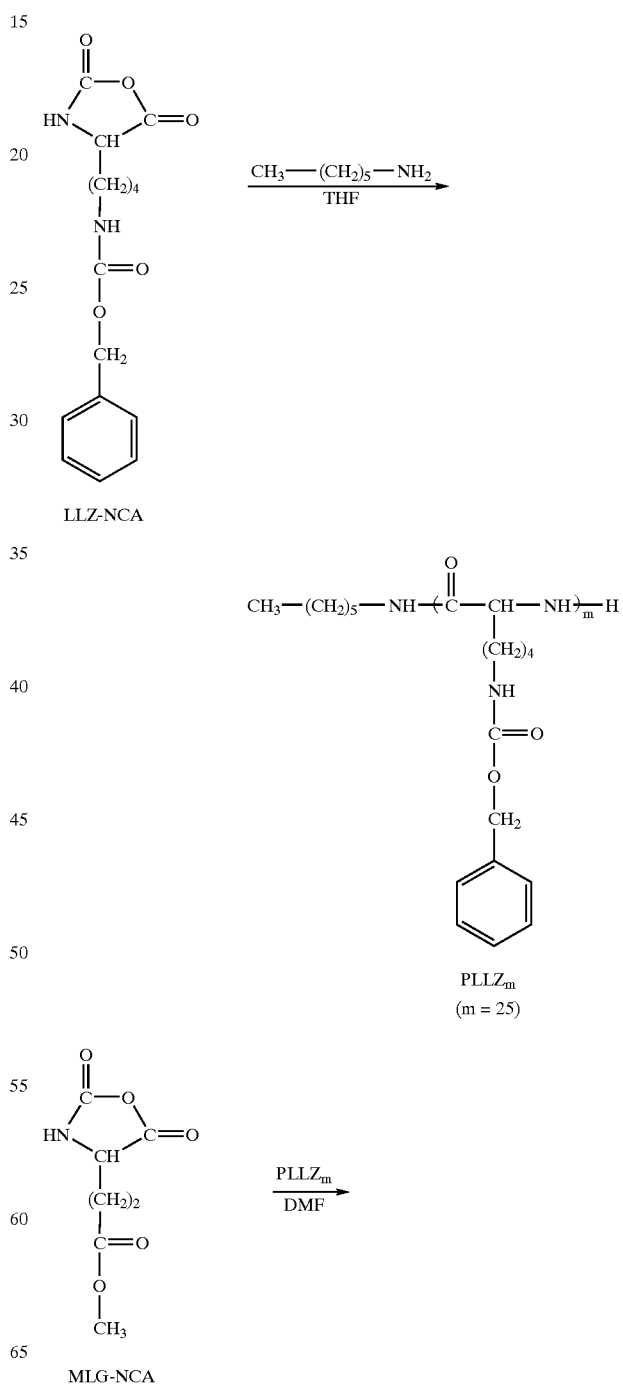

-continued

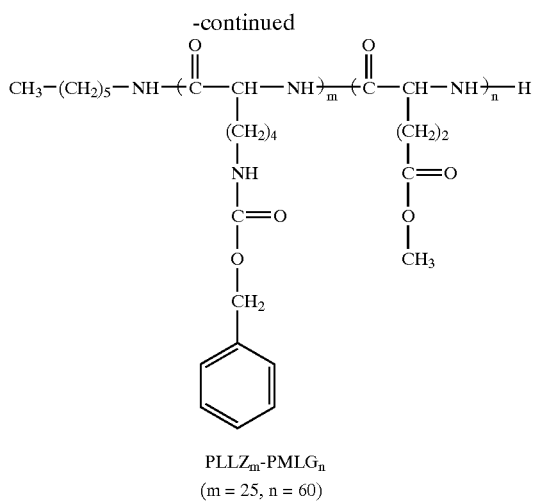

PLLZ$_m$-PMLG$_n$
(m = 25, n = 60)

Synthesis of the α-helix polypeptide is not limited to the above-described method, and the α-helix polypeptide can be synthesized by a genetic engineering method. Specifically, the α-helix polypeptide can be manufactured by transforming a host cell by a expression vector in which is integrated a DNA which encodes the target polypeptide, and culturing the transformant, or the like.

Examples of the expression vector include a plasmid vector, a fuzzy vector, a plasmid and fuzzy chimeric vector, and the like.

Examples of the host cell include prokaryotic microorganisms such as *E. coli, Bacillus subtilis*, or the like; eukaryotic microorganisms such as yeast or the like; zooblasts, and the like.

The α-helix polypeptide may be prepared by removing the α-helix structural portion from a natural fibrous protein such as α-keratin, myosin, epidermin, fibrinogen, tropomysin, silk fibroin, or the like.

{DNA}

The DNA may be a single-stranded DNA. However, the DNA is preferably a double-stranded DNA from the standpoints that the rod-shape can be stably maintained, other substances can be intercalated into the interior of the molecule, and the like.

A double-stranded DNA has a double helix structure in which two polynucleotide chains, which are in the form of right-wound spirals, are formed so as to be positioned around a single central axis in a state in which they extend in respectively opposite directions.

The polynucleotide chains are formed by four types of nucleic acid bases which are adenine (A), thiamine (T), guanine (G), and cytosine (C). The nucleic acid bases in the polynucleotide chain exist in the form of projecting inwardly within a plane which is orthogonal to the central axis, and form so-called Watson-Crick base pairs. Thiamine specifically hydrogen bonds with adenine, and cytosine specifically hydrogen bonds with guanine. As a result, in a double-stranded DNA, the two polypeptide chains are bonded complementarily.

The DNA can be prepared by known methods such as PCR (Polymerase Chain Reaction), LCR (Ligase Chain Reaction), 3SR (Self-Sustained Sequence Replication), SDA (Strand Displacement Amplification), and the like. Among these, the PCR method is preferable.

Further, the DNA can be prepared by being directly removed enzymatically from a natural gene by a restriction enzyme. Or, the DNA can be prepared by a genetic cloning method, or by a chemical synthesis method.

In the case of a genetic cloning method, a large amount of the DNA can be prepared by, for example, integrating a structure, in which a normal nucleic acid has been amplified, into a vector which is selected from plasmid vectors, fuzzy vectors, plasmid and fuzzy chimeric vectors, and the like, and then introducing the vector into an arbitrary host in which propagation is possible and which is selected from prokaryotic microorganisms such as *E. coli, Bacillus subtilis*, or the like; eukaryotic microorganisms such as yeast or the like; zooblasts, and the like.

Examples of chemical synthesis methods include liquid phase methods or solid phase synthesis methods using an insoluble carrier, such as a tolyester method, a phosphorous acid method, or the like. In the case of a chemical synthesis method, the double-stranded DNA can be prepared by using a known automatic synthesizing device or the like to prepare a large amount of single-stranded DNA, and thereafter, carrying out annealing.

{Amylose}

Amylose is a polysaccharide having a spiral structure in which D-glucose, which forms starch which is a homopolysaccharide of higher plants for storage, is joined in a straight chain by α-1,4 bonds.

The molecular weight of the amylose is preferably around several thousand to 150,000 in number average molecular weight.

The amylose may be a commercially available amylose, or may be appropriately prepared in accordance with known methods.

Amylopectin may be contained in a portion of the amylose.

The length of the rod-shaped body is not particularly limited, and may be appropriately selected in accordance with the object. However, from the standpoint of causing reflection of incident light as colored interference light, which will be described later, a length of 810 nm or less is preferable, and 10 nm to 810 nm is more preferable.

The diameter of the rod-shaped body is not particularly limited, and is about 0.8 to 2.0 nm in the case of the α-helix polypeptide.

The entire rod-shaped body may be hydrophobic or hydrophilic. Or, the rod-shaped body may be amphiphilic such that a portion thereof is hydrophobic or hydrophilic, and the other portion thereof exhibits the opposite property of the one portion. In the case of an amphiphilic rod-shaped body, the numbers of the lipophilic (hydrophobic) portions and hydrophilic portions are not particularly limited, and may be appropriately selected in accordance with the object. Further, in this case, the portions which are lipophilic (hydrophobic) and the portions which are hydrophilic may be positioned alternately, or either type of portion may be positioned only at one end portion of the rod-shaped body.

An example of an amphiphilic rod-shaped body is shown in FIG. 1. In FIG. 1, a rod-shaped body 10 has a hydrophobic portion 10a at one end side thereof, and has a hydrophilic portion 10b at the other end side thereof.

<Film>

The film reflects incident light as colored interference light.

Reflection of the incident light as the colored interference light is a color formation (color of interference light) in which, when an external stimulus, such as an electric field, a magnetic field, heat, light (e.g., natural light, infrared light, ultraviolet light), or the like, is applied to the film, light of a specific wavelength is reflected in accordance with the thickness of the film and the refractive index thereof, on the basis of the multilayer thin-film interference theory which is the basic principle of color formation of the scaly powder of the wings of a Morpho butterfly. As a result, color formation (colored interference light) occurs at the surface of the film. The color tone can be arbitrarily controlled, like the epidermis of a chameleon, by the external stimulus.

Hereinafter, the principles of light reflection of incident light as colored interference light will be explained.

Figure 2:
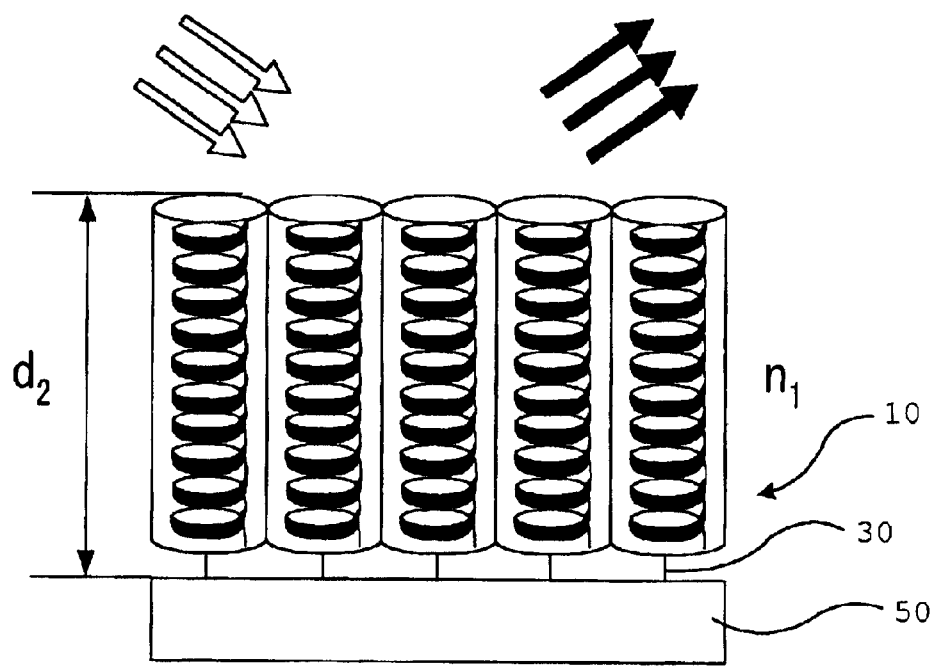
FIG. 2 is a schematic view for explaining interference of light due to a monomolecular film of the rod-shaped bodies which is provided on a substrate.
Figure 3:
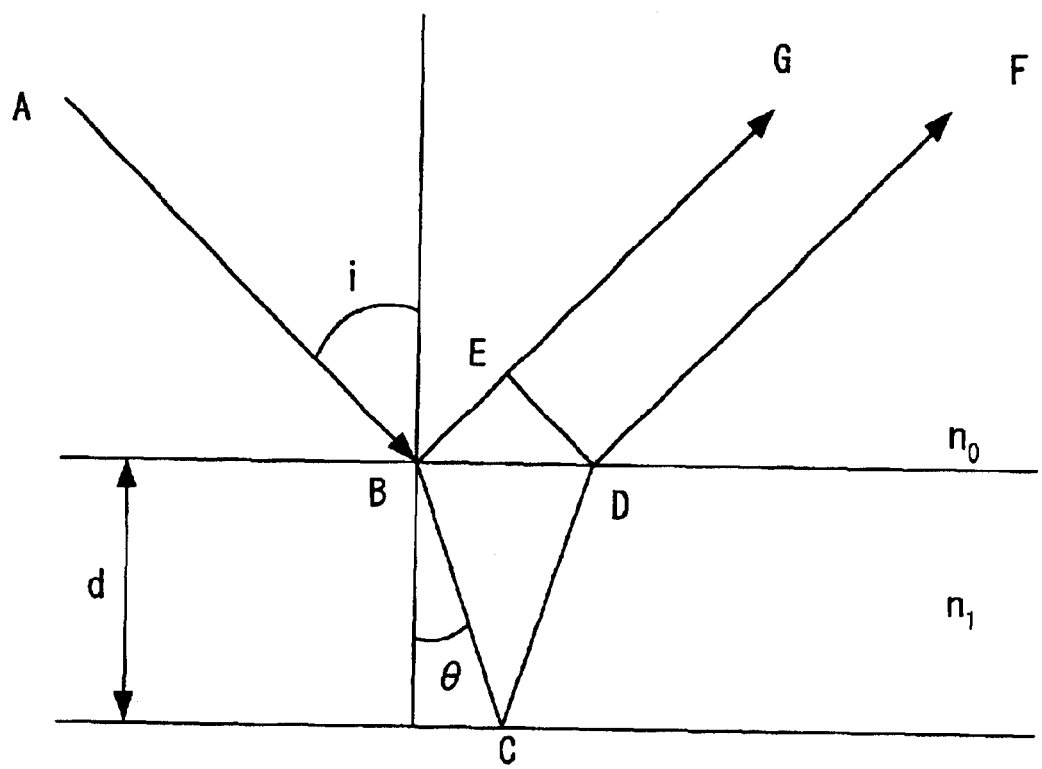
FIG. 3 is a schematic view for explaining the principles of light reflection of an incident light as colored interference light.

As shown in FIGS. 2 and 3, the wavelength (λ) of the interference light due to the film of the rod-shaped body at the time when light is irradiated onto the film, is emphasized under the condition expressed by following (1), and is enfeebled under the condition expressed by following (2).

$$\lambda = \frac{2tl}{m}\sqrt{n^2 - \sin^2\alpha} \quad (1)$$

$$\lambda = \frac{4tl}{2m-1}\sqrt{n^2 - \sin^2\alpha} \quad (2)$$

In above formulas (1) and (2), λ is the wavelength (nm) of the interference light, α is the angle of incidence (°) of the light onto the film, t is the thickness (nm) of the film, 1 is the number of films, n is the refractive index of the film, and m is an integer of 1 or more.

The thickness of the film is preferably 810 nm or less, and 10 nm to 810 nm is more preferable.

By appropriately changing the thickness of the film, the color (wavelength) of the interference light can be changed. In this case, applications to color image formation and the like are possible.

The film may be a monomolecular film, or may be a laminated film formed by monomolecular films.

The monomolecular film or laminated film formed by monomolecular films can be formed, for example, in accordance with Longmuir-Blodgett's technique (the LB technique). At this time, a known LB film forming device (e.g., NL-LB400NK-MWC manufactured by Nippon Laser & Electronics Laboratories, Co., or the like is suitable) may be used.

Figure 4:
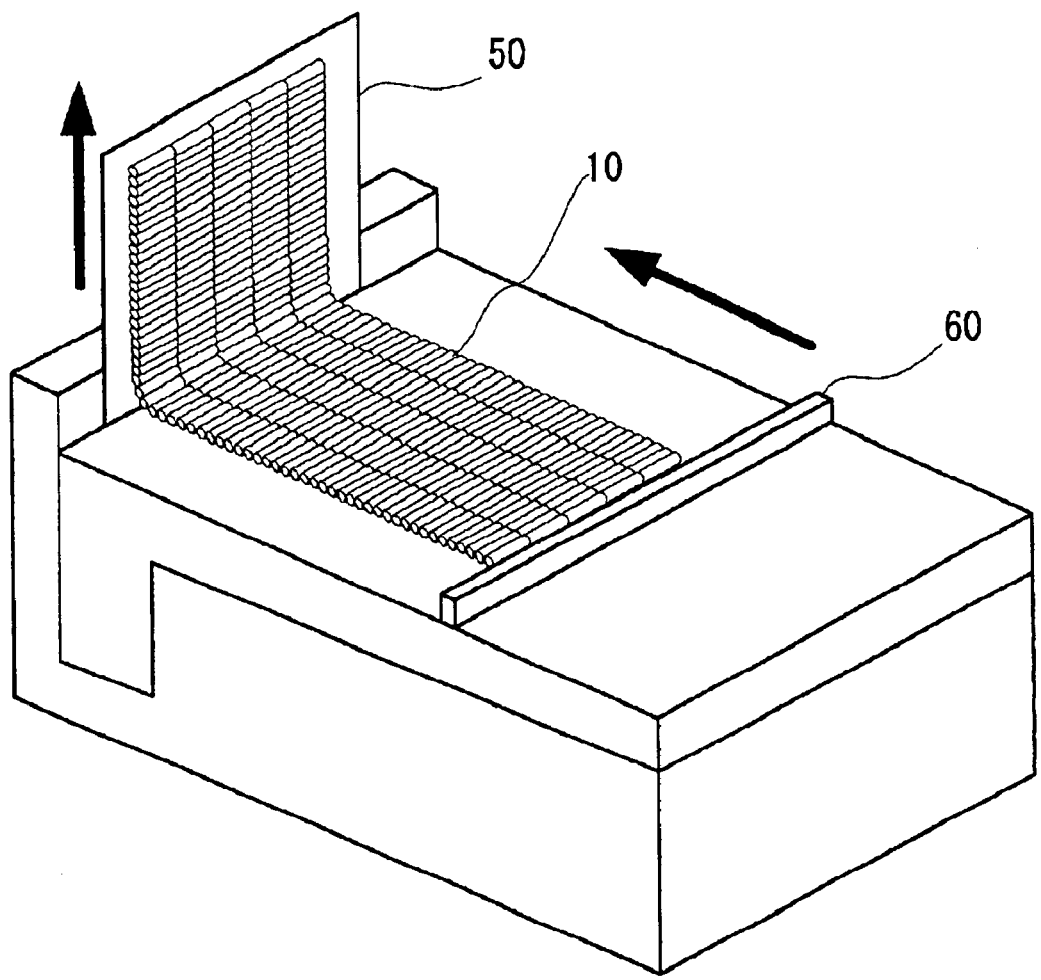
FIG. 4 is a schematic explanatory view illustrating an example of formation of a monomolecular film by the rod-shaped bodies.

The formation of the monomolecular film can be carried out by, for example, forming the monomolecular film on a substrate 50 by using an extruder member 60 in a state in which lipophilic (hydrophobic) or amphiphilic rod-shaped bodies are floating on a water surface (on an aqueous phase), or in a state in which hydrophilic or amphiphilic rod-shaped bodies are floating on an oil surface (on an oil phase), i.e., as shown in FIG. 4, in a state in which the rod-shaped bodies 10 are oriented. By repeating this operation, a laminated film, in which an arbitrary number of monomolecular films is laminated on the substrate 50, can be formed. Note that fixing the monomolecular film or the laminated film to the substrate 50 is preferable from the standpoint that the light reflection of incident light as colored interference light by the monomolecular film or the laminated film can be manifested stably.

The substrate 50 is not particularly limited, and the material, configuration, size, and the like thereof can be appropriately selected in accordance with the object. However, it is preferable that the surface thereof is subjected in advance to an appropriate surface treatment for the purpose of facilitating adhesion and bonding of the rod-shaped bodies 10 thereto. For example, in a case in which the rod-shaped bodies 10 (e.g., α-helix polypeptides) are hydrophilic, it is preferable to carry out in advance a surface treatment such as a hydrophilicizing treatment or the like using octadecyl/trimethyl siloxane or the like.

Figure 5:
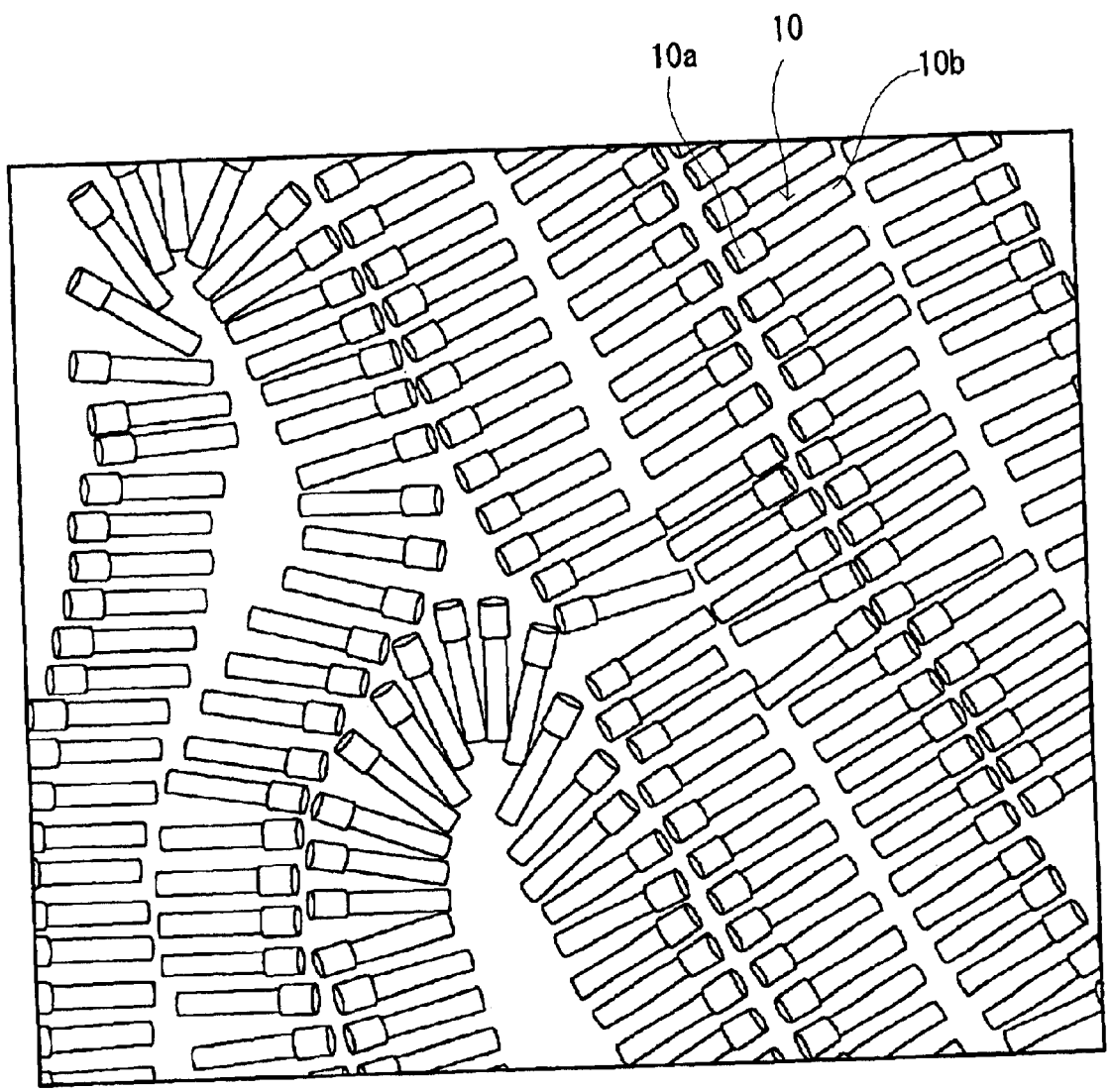
FIG. 5 is a schematic explanatory view illustrating an example of a state in which the amphiphilic rod-shaped bodies are oriented on water (an aqueous phase).

When a monomolecular film of amphiphilic rod-shaped bodies is formed, the state of the rod-shaped bodies floating on an oil phase or an aqueous phase is, as shown in FIG. 5, such that, on the aqueous phase or the oil phase, the lipophilic portions (hydrophobic portions) 10a of the rod-shaped bodies 10 are oriented adjacent to one another, and the hydrophilic portions 10b are oriented adjacent to one another.

Figure 6:
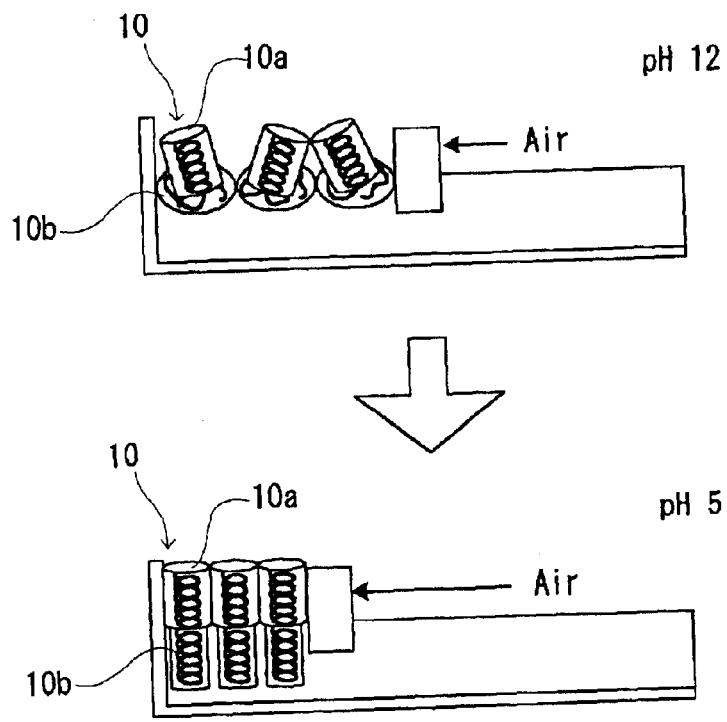
FIG. 6 is a schematic explanatory view illustrating an example of a method of providing the amphiphilic rod-shaped bodies erect on water (an aqueous phase).

The above is an example of a monomolecular film or a laminated film formed by monomolecular films, in which the rod-shaped bodies are oriented in the planar direction of the monomolecular film (i.e., are in a state of lying down sideways). However, a monomolecular film in which the rod-shaped bodies are oriented in the direction of thickness of the monomolecular film (i.e., are in a state of standing erect) can be formed as follows for example. Namely, as shown in FIG. 6, first, in a state in which the amphiphilic rod-shaped bodies 10 (α-helix polypeptides) are floating on the water surface (on the aqueous phase) (i.e., in the state in which the rod-shaped bodies 10 are lying down sideways), the pH of the water (the aqueous phase) is made to be alkaline (about 12). Thus, the α-helix structures of the hydrophilic portions 20b of the rod-shaped bodies 10 (α-helix polypeptides) come undone and the hydrophilic portions 10b come to have random structures. At this time, the α-helix structures of the lipophilic portions (hydrophobic portions) 10a in the rod-shaped bodies 10 (α-helix polypeptides) are maintained as they are. Next, the pH of the water (the aqueous phase) is made to be acidic (about 5). Thus, the hydrophilic portions 10b of the rod-shaped bodies 10 (α-helix polypeptides) again assume α-helix structures. At this time, when a pushing member, which abuts the rod-shaped bodies 10 (α-helix polypeptides), pushes the rod-shaped bodies 10 (α-helix polypeptides) from the side surface of the pushing member due to air pressure, the rod-shaped bodies 10 remain in their erect state with respect to the water (the aqueous phase), and the hydrophilic portions 10b thereof are, in the aqueous phase, directed in a direction which is substantially orthogonal to the water surface and take on α-helix structures. Then, as was described above with reference to FIG. 5, by extruding the rod-shaped bodies 10 (α-helix polypeptides) on the substrate 50 by using the extruder member 60 in the state in which the rod-shaped bodies 10 (α-helix polypeptides) are oriented, the monomolecular film can be formed on the substrate 50. By repeating this operation, a laminated film, in which an arbitrary number of monomolecular films is laminated, can be formed on the substrate 50.

The rod-shaped bodies are oriented in the film. In the present invention, it is preferable that the rod-shaped bodies have a structure variable body attached or bonded thereto.

The structure variable body is not particularly limited, provided that the structure thereof can be changed by a stimulus, and can be appropriately selected in accordance with the object.

Examples of the stimulus are chemical stimuli and physical stimuli.

Examples of chemical stimuli are varying the pH, making specific substances co-exist, and the like. Examples of physical stimuli are light, an electrical field, heat, a magnetic field, pressure, and the like. Any of light, an electrical field, and heat are preferable.

Examples of structure variable bodies whose structures can be varied by light include photochemical reaction compounds. Examples of photochemical reaction compounds include photochemical ring-opening compounds such as spirobenzopyran or the like, compounds having photoionized functional groups, stereoisomers, and the like.

Among stereoisomers, geometrical isomers are particularly preferable from the standpoint that their structures are suitably varied by light such that the color formation i.e., color reflection can be varied.

One type of structure variable body, whose structure can be changed by light, may be used alone, or two or more types may be used in combination.

Examples of structure variable bodies, whose structures can be changed by an electrical field, are liquid crystalline molecules and the like.

Examples of liquid crystalline molecules are rod-shaped liquid crystalline molecules and discotic liquid crystalline molecules.

Examples of rod-shaped liquid crystalline molecules are azomethine compounds, azoxy compounds, cyan biphenyl compounds, cyano phenylester compounds, ester benzoate compounds, phenylester cyclohexane carboxylic acid compounds, cyanophenyl cyclohexane compounds, cyano-substituted phenylpyrimidine compounds, alkoxy-substituted phenylpyrimidine compounds, phenyldioxane compounds, tolane compounds, alkenyl cyclohexyl benzonitrile compounds, and the like. Further, macromolecular liquid crystalline molecules are also suitable examples.

Examples of the discotic liquid crystalline molecules are compounds disclosed in various publications (such as C. Destrade et al., "Mol. Crysr. Liq. Cryst.", Vol. 71, p. 111 (1981); "Kikan Kagaku Sosetsu" ("Quarterly Chemical Review"), No. 22, "Ekisho no Kagaku" ("Chemistry of Liquid Crystals"), Chapter 5, Chapter 10, Section 2 (1994), edited by the Chemical Society of Japan; B. Kohne et al., Angew, "Chem. Soc. Chem. Comm.", p. 1794 (1985); J. Zhang et al., "J. Am. Chem. Soc.", Vol. 16, p. 2655 (1994)), and in Japanese Patent Application Laid-pen (JP-A) No. 5-5837, JP-A No. 8-27284, JP-A No. 8-334621, JP-A No. 9-104656, and the like.

One type of structure variable body, whose structure can be changed by an electrical field, may be used alone, or two or more types may be used in combination.

Examples of structure variable bodies, whose structures can be changed by heat, are substances exhibiting thermal expansion, thermal contraction, and the like. Examples include substances exhibiting crystal fusion due to heat or substances exhibiting crystallization due to heat, thermoplastic substances, thermosetting substances, liquid crystalline molecules, and the like.

Examples of thermoplastic substances are thermoplastic resins. Specific examples include polyethylene, polypropylene, polyvinyl chloride, polystyrene, polyvinylidene chloride, fluorine resins, polymethyl methacrylate, and the like, polycondensation polyamide, polyester, polycarbonate, polyphenylene oxide, polyaddition thermoplastic polyurethane, ring-opening polymerization polyacetal, and the like.

Examples of the thermosetting substances are thermosetting resins, and specifically, urea resins, melamine resins, phenol resins, and the like.

One type of structure variable body, whose structure can be changed by heat, may be used alone, or two or more types may be used in combination.

Structure variable bodies whose structures can be reversibly changed are preferably used as the structural variable bodies from the standpoint that they can be suitably used in various types of applications requiring control of changes in color formation. For this reason, geometrical isomers, liquid crystalline molecules and the like are preferable, and geometrical isomers are more preferable.

The geometrical isomer is not particularly limited provided that its structure can be changed by light. Examples thereof include cis-trans isomers, syn-anti isomers, and the like. Compounds having a structure including an azo group (—N═N—), for example, azo compounds, azoxy compounds, and the like, are particularly suitable.

Examples of azo compounds include azobenzene compounds, azomethane compounds, azodicarbonamide compounds, diethyl azodicarboxylic acid compounds, and the like.

Examples of the azoxy compounds include azoxy dibenzoate compounds, azoxybenzene compounds, and the like.

The change in the structure when the azobenzene compound is irradiated by light is as follows. An azobenzene compound (a trans isomer) usually has an absorption band of 300 to 400 nm, and is a molecule in which the length between the para positions with respect to the azo group in the benzene rings is about 9.0 Å (following (a)). By irradiating this compound with ultraviolet light, the structure changes to an azobenzene compound (a cis isomer) which is a molecule in which the length between the para positions with respect to the azo group in the benzene rings is about 5.5 Å (following (b)), and the formed color changes suitably.

Formula 2

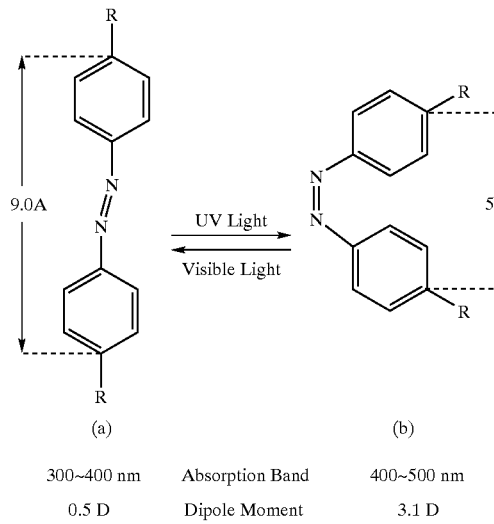

| | | |
|---|---|---|
| 300~400 nm | Absorption Band | 400~500 nm |
| 0.5 D | Dipole Moment | 3.1 D |

Figure 7:
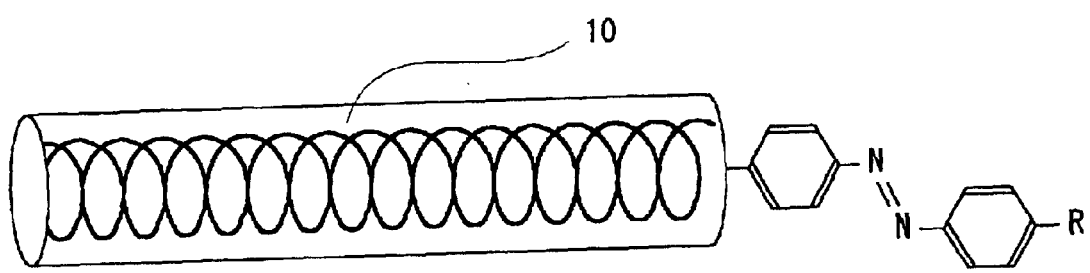
FIG. 7 is a schematic explanatory view illustrating an aspect in which a structure variable body is bonded to one end of the rod-shaped body.
Figure 8:
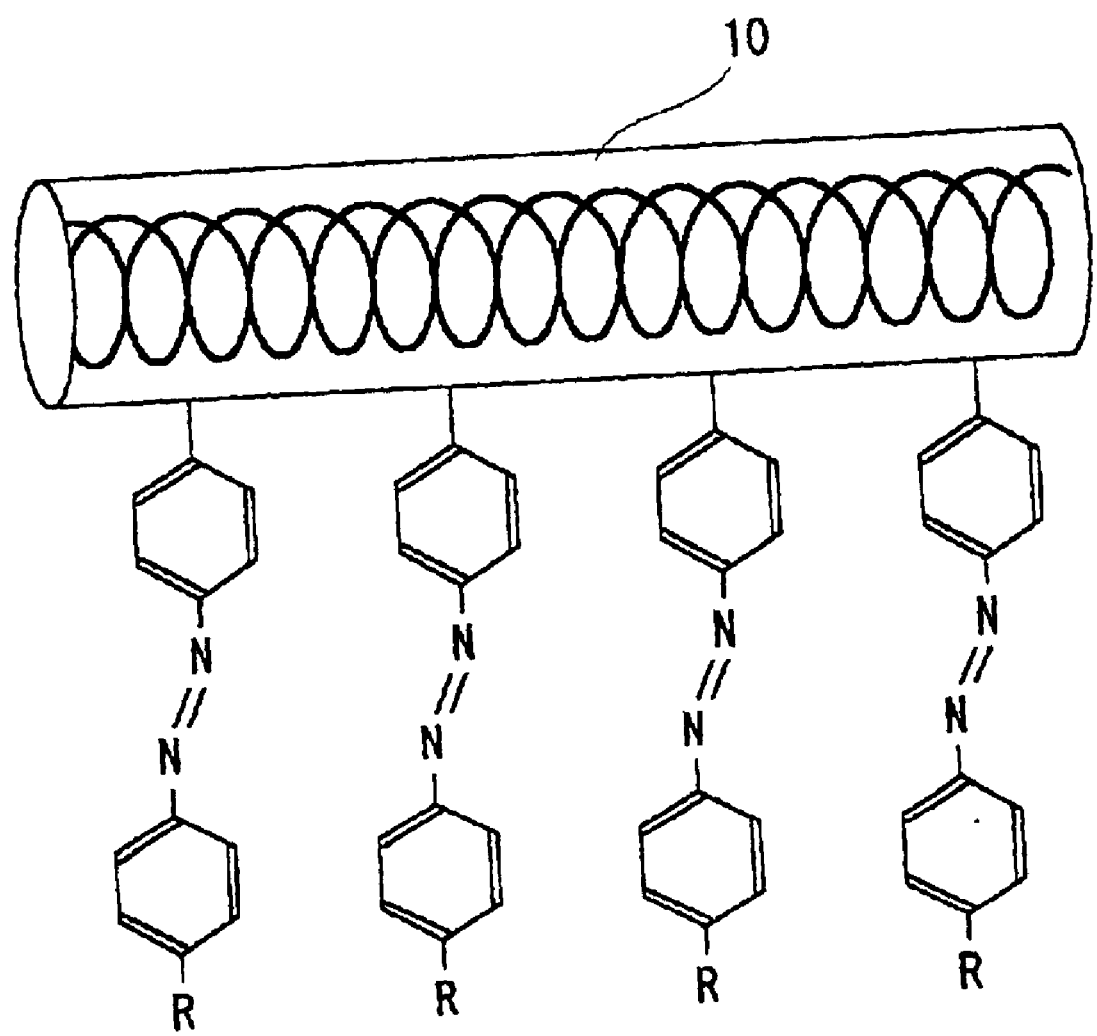
FIG. 8 is a schematic explanatory view illustrating an aspect in which structure variable bodies are bonded to a peripheral side surface of the rod-shaped body.

The structure variable body may be bonded to the straight chain of the rod-shaped body as shown in FIG. 7, or may be bonded to the side chains as shown in FIG. 8.

The method of bonding the structure variable body to the rod-shaped body is not particularly limited, and can be appropriately selected in accordance with the type of the structure variable body, the type of the rod-shaped body, and the like.

When the structure variable bodies are bonded to the side chains of the rod-shaped body, the ratio of the structure variable bodies to all of the side chains of the rod-shaped body is not particularly limited, and can be appropriately selected as desired.

At the image forming element, when a stimulus (light, an electrical field, heat, or the like) is applied, the structure of the structure variable body changes. The thickness of the film in the image forming element freely changes due to the change in the structure of the structure variable body.

Figure 9:
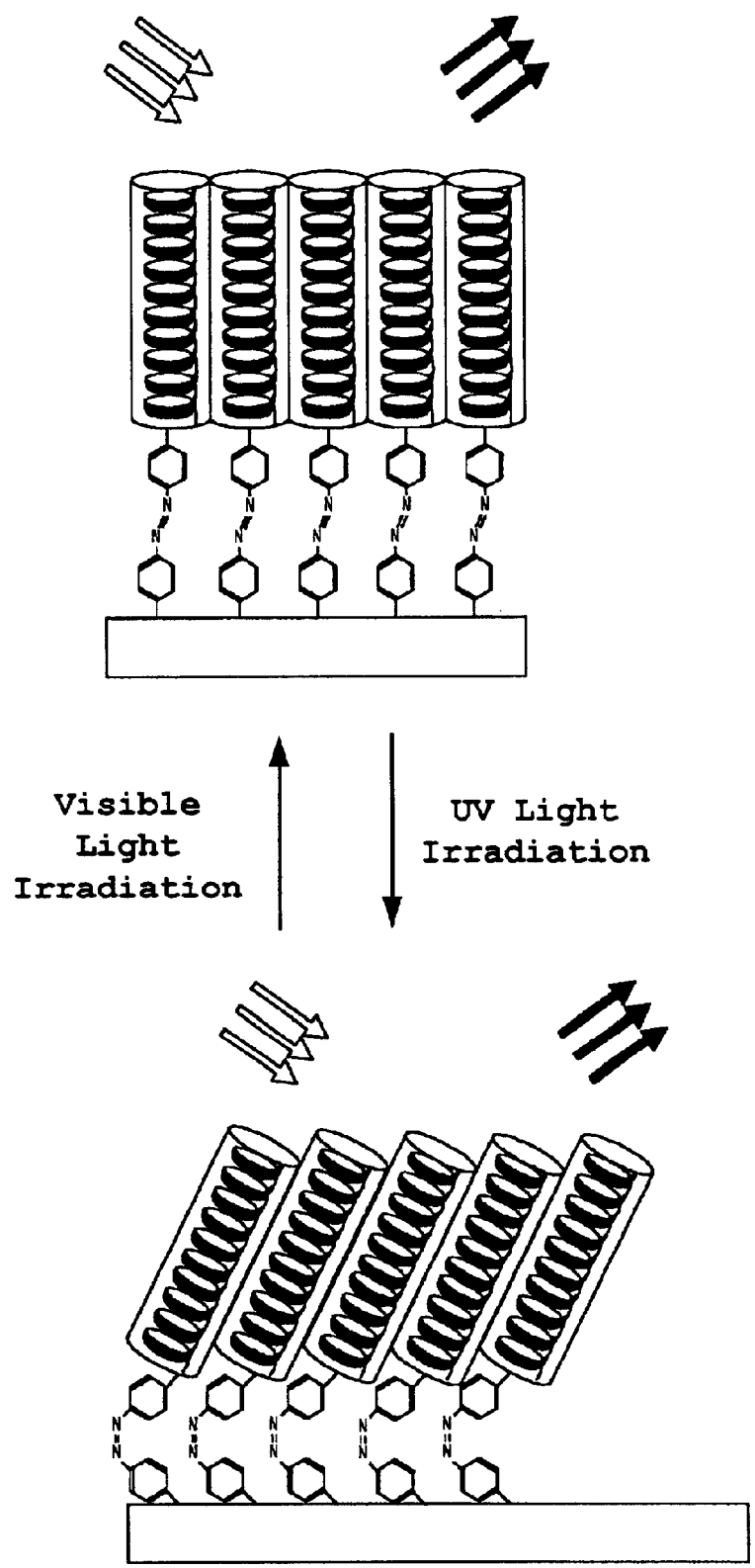
FIG. 9 is a schematic explanatory view illustrating an example of an image forming element of the present invention.
Figure 10:
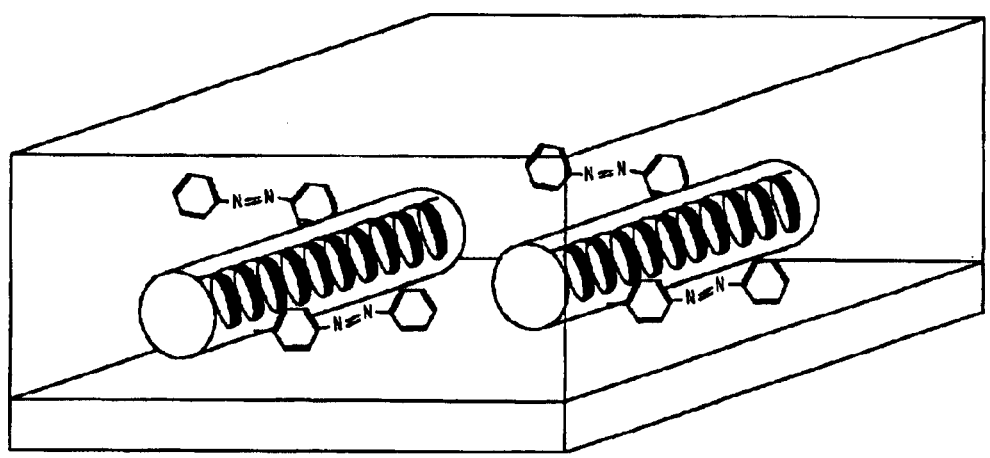
FIG. 10 is a schematic explanatory view illustrating another example of an image forming element of the present invention.
Figure 10:
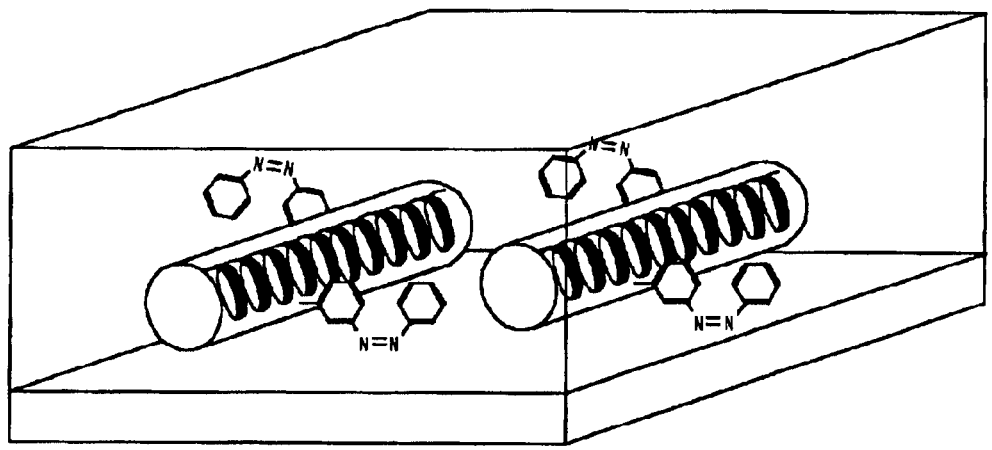

For example, if the rod-shaped bodies in the image forming element are an α-helix polypeptide and the structure variable bodies chemically bonded to the rod-shaped bodies are an azobenzene compound, in a state in which one end of the azobenzene compound chemically binds to one end of the α-helix polypeptide and the other end of the azobenzene compound chemically binds to the substrate, as shown in FIG. 9, the azobenzene compound assumes a trans structure at the time when visible light is irradiated, and assumes a cis structure at the time when ultraviolet light is irradiated. The thickness of the film is greater when the azobenzene compound has a trans structure than when it has a cis structure. Further, in a state in which one end of the azobenzene compound is bonded to the peripheral side surface of the α-helix polypeptide and the α-helix polypeptide is fixed to the substrate in a state of being oriented horizontally, as shown in FIG. 10, the azobenzene compound assumes a trans structure at the time when visible light is irradiated, and assumes a cis structure at the time when ultraviolet light is irradiated. The thickness of the film is greater when the azobenzene compound has a trans structure than when it has a cis structure.

Here, if the thickness of the film in the image forming element is determined so as to reflect incident light as colored interference light at the time when ultraviolet light is irradiated and to not reflect light as colored interference light at the time when visible light is irradiated, the reflection of the colored interference light can be manifested in an ON-OFF manner. Further, if the thickness of the film in the image forming element is determined so as to exhibit formation of a color due to light reflection as colored interference light at the time when ultraviolet light is irradiated and to exhibit formation of another color at the time when visible light is irradiated, the colored interference light can be changed between two colors. Such image forming elements can be suitably used in image formation.

The image forming element is easy to manufacture, can form images easily and at a low cost, is stable without the fear of environmental problems arising at the time of disposal, can be used widely in various fields, can be suitably used in the field of image formation and in the field of color image formation, and can particularly suitably be used in the image forming device of the present invention.

{Image Forming Device}

The image forming device of the present invention is equipped with at least the image forming element of the present invention, and a means for irradiating light for irradiating light onto the image forming element. In the case in which the image forming element has the structure variable body, the image forming device also comprises means for applying stimulus which applies a stimulus to the structure variable body, and has other means which are appropriately selected as needed.

The image forming device is equipped with the image forming element as a pixel for image formation. The pixel may be formed by a single type of the image forming element, or may be formed by two or more types of the image forming element.

In the latter case, it is preferable that the image forming device is formed by appropriately selecting the combination of wavelengths of the interference lights by the image forming elements which are used. Specifically, it is preferable that the image forming device is formed by using an image forming element which reflects incident light as blue interference light (a blue element), an image forming element which reflects incident light as green interference light (a green element), and an image forming element which reflects incident light as red interference light (a red element). In this case, the image forming device is preferable from the standpoint that the color formation of the pixels can be made to be full color. In this case, when the blue color element and the green color element reflect light, the pixel becomes cyan color, and when the blue element and the red element reflect light, the pixel becomes magenta color, and when the green element and the red element reflect light, the pixel becomes yellow color.

In the present invention, when the color of the interference light is blue, it suffices that the wavelength of the interference light is in a wavelength region generally exhibiting blue, and is, for example, a wavelength in a region which is about 400 nm or more and less than 500 nm. When the color of the interference light is green, it suffices that the wavelength of the interference light is in a wavelength region generally exhibiting green, and is, for example, a wavelength in a region which is about 500 nm or more and less than 600 nm. When the color of the interference light is red, it suffices that the wavelength of the interference light is in a wavelength region generally exhibiting red, and is, for example, a wavelength in a region which is about 600 nm or more and less than 700 nm.

The means for irradiating light is not particularly limited, and may be appropriately selected in accordance with the object. Suitable examples are a light source which can irradiate visible light, or the like.

It is preferable that the driving of the means for irradiating light is controlled by a means for controlling such as a computer or the like.

The means for applying stimulus is not particularly limited, and may be appropriately selected in accordance with the type of the structure variable body. Suitable examples are a light source which can switch between irradiating visible light and irradiating ultraviolet light, a power source which can apply an electrical field, a heat source which can apply heat, and the like.

It is preferable that the driving of the means for applying stimulus is controlled by a means for controlling such as a computer or the like.

The mode of the image forming device is not particularly limited, and may be appropriately selected in accordance with the object. For example, a mode in which the image forming element reflects, as interference light, light which is irradiated by the means for irradiating light, and the wavelength of the interference light is 300 to 810 nm is preferable.

Further, a mode is preferable in which the image forming device has, as the image forming elements, at least an image forming element which reflects incident light as blue interference light, an image forming element which reflects incident light as green interference light, and an image forming element which reflects incident light as red interference light, and the pixel is formed by these image forming elements.

Further, a mode is preferable in which the image forming device has the means for applying stimulus, and the structure of the structure variable body in the image forming element is varied reversibly to a first structure and a second structure by the stimulus of the means for applying stimulus, and the wavelength of the interference light by the image forming element in a case in which the structure variable body has at least one of the first structure and the second structure is 300 to 810 nm.

In addition, a mode is preferable in which the image forming device has the means for applying stimulus, and has a plurality of pixels which have at least an image forming element (hereinafter, "blue element") for reflecting incident light as blue interference light in a case in which the structure variable body has a first structure and for reflecting incident light as colorless light in a case in which the structure variable body has a second structure (meaning a case in which the interference light is light other than visible light; the same holds hereinafter), and an image forming element (hereinafter, "green element") for reflecting incident light as green interference light in a case in which the structure variable body has a first structure and for reflecting incident light as colorless interference light in a case in which the structure variable body has a second structure, and an image forming element (hereinafter, "red element") for reflecting incident light as red interference light in a case in which the structure variable body has a first structure and for reflecting incident light as colorless interference light in a case in which the structure variable body has a second structure. In other words, a mode in which the image forming device has a plurality of pixels, which have a blue element and a green element and a red element, is preferable.

In the case of this mode, when the means for applying stimulus applies a blue color forming stimulus, a green color forming stimulus, and a red color quenching stimulus, at the pixel, cyan color is exhibited by synthesis of the formed colors of blue and green. When the means for applying stimulus applies a blue color forming stimulus, a green color quenching stimulus, and a red color forming stimulus, at the pixel, magenta color is exhibited by synthesis of the formed colors of blue and red. When the means for applying stimulus applies a blue color quenching stimulus, a green color forming stimulus and a red color forming stimulus, at the pixel, yellow color is exhibited by the synthesis of the formed colors of green and red. When the means for applying stimulus applies a blue color forming stimulus, a green color forming stimulus, and a red color forming stimulus, at the pixel, white is exhibited by the synthesis of the formed colors of blue, green and red. When the means for applying stimulus applies a blue color quenching stimulus, a green color quenching stimulus, and a red color quenching stimulus, at the pixel, no color is formed, and the black color of the substrate is exhibited. Accordingly, the image forming device is preferable from the standpoint that formation of a full color image is possible by combining these pixels.

Because the image forming device uses the image forming element of the present invention, the image forming device is easy to manufacture, can form images easily and at a low cost, is stable without the fear of causing environmental problems at the time of disposal, can form color images, and can be suitably used in various fields of image formation.

<Preferable Modes of the Present Invention>

Hereinafter, preferable modes of the present invention will be described.

<1> An image forming element comprising a film in which rod-shaped bodies are oriented and which reflects incident light as colored interference light.

<2> An image forming element according to <1>, wherein the thickness of the film is 810 nm or less.

<3> An image forming element according to <1>, wherein the rod-shaped bodies are rod-shaped organic molecules, and the film is one of a monomolecular film of the rod-shaped organic molecules, and a laminated film of the monomolecular film.

<4> An image forming element according to <1>, wherein interference light by the film is emphasized by the condition of following formula (1), and is enfeebled by the condition of following formula (2):

$$\lambda = \frac{2tl}{m}\sqrt{n^2 - \sin^2\alpha} \quad (1)$$

$$\lambda = \frac{4tl}{2m-1}\sqrt{n^2 - \sin^2\alpha} \quad (2)$$

wherein in formula (1) and formula (2), $\lambda$ is the wavelength (nm) of the interference light, $\alpha$ is the angle of incidence (°) of light onto the film, t is the thickness (nm) of the film, 1 is the number of laminated layers of the film, n is the refractive index of the film, and m is an integer of 1 or more.

<5> An image forming element according to <1>, wherein the film is fixed to a substrate.

<6> An image forming element according to <1>, wherein the rod-shaped bodies are α-helix polypeptides.

<7> An image forming element according to <1>, wherein a structure variable body, whose structure can be changed by a stimulus, is bonded to at least one of an end portion and a peripheral side surface of the rod-shaped body.

<8> An image forming element according to <7>, wherein when the structure of the structure variable body changes, the color of the colored interference light changes.

<9> An image forming element according to <7>, wherein the structure of the structure variable body can be changed by any of light, heat, and an electrical field.

<10> An image forming element according to <9>, wherein the structure variable body is selected from a geometrical isomer, a thermoplastic substance, a thermosetting substance, and a liquid crystalline molecule.

<11> An image forming element according to <10>, wherein the structure variable body is an azobenzene compound.

<12> An image forming device comprising an image forming element, and means for irradiating light onto the image forming element, wherein the image forming element comprises a film in which rod-shaped bodies are oriented and which reflects, as interference light, a light irradiated by the means for irradiating, and the interference light has a wavelength of 300 to 810 nm.

<13> An image forming device according to <12>, wherein the image forming device has a plurality of pixels having at least an image forming element for reflecting incident light as blue interference light, an image forming element for reflecting incident light as green interference light, and an image forming element for reflecting incident light as red interference light.

<14> An image forming device comprising an image forming element; means for irradiating light onto the image forming element; and means for applying a stimulus to a structure variable body in the image forming element; wherein the image forming element comprises a film in which rod-shaped bodies having the structure variable body whose structure can be changed by a stimulus and bonded to at least one of an end portion and a peripheral side surface thereof, are oriented and which reflects, as interference light, a light irradiated by the means for irradiating, and the interference light has a wavelength of 300 to 810 rim.

<15> An image forming device according to <14>, wherein a structure of the structure variable body in the image forming element is varied reversibly to a first structure and to a second structure by the stimulus of the means for applying the stimulus, and the wavelength of the interference light by the image forming element in a case in which the structure variable body has at least one of the first structure and the second structure is 300 to 810 nM.

<16> An image forming device according to <14>, wherein the image forming device has a plurality of pixels which have at least: an image forming element for reflecting incident light as blue interference light in a case in which the structure variable body has a first structure and for reflecting incident light as colorless interference light in a case in which the structure variable body has a second structure, an image forming element for reflecting incident light as green interference light in a case in which the structure variable body has a first structure and for reflecting incident light as colorless interference light in a case in which the structure variable body has a second structure, and an image forming element for reflecting incident light as red interference light in a case in which the structure variable body has a first structure and for reflecting incident light as colorless interference light in a case in which the structure variable body has a second structure.

The image forming element according to <1> includes at least the film in which the rod-shaped bodies are oriented and which exhibits color formation. In the image forming element, the film reflects incident light as colored interference light based on the multilayer thin-film interference theory which is the basic principle of color formation of the scaly powder of the wings of a Morpho butterfly. When an external stimulus such as an electrical field, a magnetic field, heat, light (e.g., natural light, infrared light, ultraviolet light) or the like is applied to the film, in accordance with the thickness of the film and the refractive index thereof, interference light of a specific wavelength is reflected and color formation occurs at the surface of the film. In this color formation (colored interference light), the color tone can be arbitrarily controlled, like the epidermis of a chameleon, by the external stimulus. Thus, the image forming element can form images.

In the image forming element according to <2>, in above <1>, the thickness of the film is 810 nm or less. Thus, visible light irradiated onto the film is reflected as interference light. As a result, the film reflects incident light as colored interference light, and the image forming element can form images.

In the image forming element according to <3>, in above <1>, the rod-shaped bodies are rod-shaped organic molecules, and the film is one of a monomolecular film of the rod-shaped organic molecules, and a laminated film of the monomolecular film. Thus, the thickness of the film can be freely changed by the thickness, the number of laminated layers, and the like of the monomolecular film, and the color formation (color of colored interference light) can be adjusted.

In the image forming element according to <4>, in above <1>, interference light by the film is emphasized by the condition of following formula (1), and is enfeebled by the condition of following formula (2). Thus, by appropriately selecting the condition of formula (1) and the condition of formula (2), a state in which the desired colored interference light is enhanced can be obtained. Further, by selecting and combining a plurality of types of image forming elements, multicolor colored interference light can be achieved.

$$\lambda = \frac{2tl}{m}\sqrt{n^2 - \sin^2\alpha} \quad (1)$$

$$\lambda = \frac{4tl}{2m-1}\sqrt{n^2 - \sin^2\alpha} \quad (2)$$

In formula (1) and formula (2), $\lambda$ is the wavelength (nm) of the interference light, $\alpha$ is the angle of incidence (°) of light onto the film, t is the thickness (nm) of the film, l is the number of laminated layers of the film, n is the refractive index of the film, and m is an integer of 1 or more.

In the image forming element of <5>, in above <1>, the film is fixed to a substrate. Thus, it is possible for the image forming element to be provided upright or the like, and the image forming element can be disposed at an arbitrary position.

In the image forming element of <6>, in above <1>, the rod-shaped bodies are α-helix polypeptides. In the rod-shaped body, by merely changing the degree of polymerization of the polypeptide, the spiral length of the α-helix can be varied, and the thickness of the film can be adjusted. Further, the film is biodegradable, and therefore is safe and does not cause environmental problems at the time of disposal.

In the image forming element of <7>, in above <1>, a structure variable body, whose structure can be changed by a stimulus, is bonded to at least one of an end portion and a peripheral side surface of the rod-shaped body. In the image forming device, because the rod-shaped bodies which form the film have the structure variable bodies, when a stimulus is applied, the structures of the structure variable bodies change. As a result, the thickness of the film changes. Thus, color formation (the color of the colored interference light) can change at approximately the same time as the change in the thickness of the film.

In the image forming element of <8>, in above <7>, when the structures of the structure variable bodies change, the color formation (the color of the colored interference light) changes. In the image forming device, when a stimulus is applied, the structures of the structure variable bodies change, the thickness of the film changes, and color formation (the color of the colored interference light) changes at approximately the same time as the change in the thickness of the film.

In the image forming element of <9>, in above <7>, the structure of the structure variable body can be changed by any of light, heat, and an electrical field. In the image forming device, when any of light, heat and an electrical field is applied, the structures of the structure variable bodies change, the thickness of the film changes, and color formation (the color of the colored interference light) changes at approximately the same time as the change in the thickness of the film.

In the image forming element of <10>, in above <9>, the structure variable body is selected from a geometrical isomer, a thermoplastic substance, a thermosetting substance, and a liquid crystalline molecule. In the image forming device, when any of light, heat and an electrical field is applied, the structure of the geometrical isomer, the thermoplastic substance, the thermosetting substance, or the liquid crystalline molecule changes, the thickness of the film changes, and color formation (the color of the colored interference light) changes at approximately the same time as the change in the thickness of the film.

In the image forming element of <11>, in above <10>, the structure variable body is an azobenzene compound. In the image forming device, when visible light or ultraviolet light is irradiated, the structure of the azobenzene compound changes, the thickness of the film changes, and color formation (the color of the colored interference light) changes at approximately the same time as the change in the thickness of the film.

The image forming device of <12> is equipped with at least the image forming element of above <1>, and a means for irradiating light for irradiating light onto the image forming element. The image forming element reflects, as interference light, the light irradiated by the means for irradiating light, and the wavelength of the interference light is 300 to 810 nm.

In the image forming device, the means for irradiating light irradiates light onto the image forming element. Thus, the film in the image forming element reflects incident light as colored interference light based on the multilayer thin-film interference theory which is the basic principle of color formation of the scaly powder of the wings of a Morpho butterfly. Namely, the light which is irradiated onto the film is reflected as interference light of a specific wavelength. Because the wavelength of the interference light is 300 to 810 nm, color formation (colored interference light) which can be perceived visually occurs at the surface of the film. As a result, an image can be formed.

In the image forming device of <13>, in above <12>, the image forming device has a plurality of pixels having at least an image forming element in which the color of the interference light is blue, an image forming element in which the color of the interference light is green, and an image forming element in which the color of the interference light is red.

In the image forming device, when the image forming element, which reflects incident light as blue interference light, reflects light, blue is exhibited. When the image forming element, which reflects incident light as green interference light, reflects light, green is exhibited. When the image forming element, which reflects incident light as red interference light, reflects light, red is exhibited. When the image forming element, which reflects incident light as blue interference light, and the image forming element, which reflects incident light as green interference light, reflect light, cyan color is exhibited. When the image forming element, which reflects incident light as blue interference light, and the image forming element, which reflects incident light as red interference light, reflect light, magenta color is exhibited. When the image forming element, which reflects incident light as green interference light, and the image forming element, which reflects incident light as red interference light, reflect light, yellow color is exhibited. As a result, a full-color image can be formed.

The image forming device of <14> is equipped with at least the image forming element according to <7>, a means for irradiating light for irradiating light onto the image forming element, and a means for applying stimulus for applying a stimulus to a structure variable body in the image forming element. The image forming element reflects, as interference light, light irradiated by the means for irradiating light. The wavelength of the interference light is 300 to 810 nm.

In the image forming device, the means for irradiating light irradiates light onto the image forming element. Thus, the film in the image forming element reflects incident light as colored interference light based on the multilayer thin-film interference theory which is the basic principle of color formation of the scaly powder of the wings of a Morpho butterfly. Namely, the light which is irradiated onto the film is reflected as interference light of a specific wavelength. Because the wavelength of the interference light is 300 to 810 nm, color formation (colored interference light) which can be perceived visually occurs at the surface of the film. As a result, an image can be formed. Further, the means for applying stimulus applies a stimulus to the structure variable body. Thus, the structure of the structure variable body changes, and the thickness of the film changes. When the thickness of the film changes, the wavelength of the interference light due to light reflection as colored interference light changes, and the color formation (the color of colored interference light) can change.

In the image forming device of <15>, in above <14>, the structure of the structure variable body in the image forming element is varied reversibly to a first structure and a second structure by the stimulus of the means for applying stimulus, and the wavelength of the interference light by the image forming element in a case in which the structure variable body has at least one of the first structure and the second structure is 300 to 810 nm.

In the image forming device, the means for applying stimulus applies a stimulus to the structure variable body. Thus, the structure of the structure variable body changes from the first structure to the second structure. As a result, the thickness of the film changes. Accompanying the change in the structure of the structure variable body, the thickness of the film changes reversibly between a first thickness in the case in which the structure variable body has the first structure, and a second thickness in the case in which the structure variable body has the second structure. The means for irradiating light irradiates light onto the image forming element. Thus, when the film in the image forming element has the first thickness, it reflects incident light as colored interference light based on the multilayer thin-film interference theory which is the basic principle of color formation of the scaly powder of the wings of a Morpho butterfly. Namely, the light irradiated onto the film is reflected as interference light of a specific wavelength. Because the wavelength of the interference light is 300 to 810 nm, color formation (colored interference light) which can be perceived visually occurs at the surface of the film. As a result, an image can be formed. On the other hand, when the film has the second thickness, it either does not reflect light as colored interference light, or it reflects interference light of a wavelength which is different than that of the interference light in the case in which the film has the first thickness. As a result, merely due to the means for applying stimulus applying a stimulus, the formed color of the film can be changed from a color to either no color or to a different color. Thus, at the image forming device, control of color formation (the color of colored interference light) is easy, and a desired image can be easily formed.

In the image forming device of <16>, in above <14>, the image forming device has a plurality of pixels which have at least an image forming element (hereinafter, "blue element") for reflecting incident light as blue interference light in a case in which the structure variable body has a first structure and for reflecting incident light as colorless incident light in a case in which the structure variable body has a second structure, and an image forming element (hereinafter, "green element") for reflecting incident light as green interference light in a case in which the structure variable body has a first structure and for reflecting incident light as colorless incident light in a case in which the structure variable body has a second structure, and an image forming element (hereinafter, "red element") for reflecting incident light as red interference light in a case in which the structure variable body has a first structure and for reflecting incident light as colorless interference light in a case in which the structure variable body has a second structure. In other words, the image forming device has a plurality of pixels which have a blue element and a green element and a red element.

In the image forming device, the means for applying stimulus applies a stimulus for blue element color formation. (Hereinafter, this stimulus will be called "blue color formation stimulus".) Thus, the structure of the structure variable body in the blue element changes from the first structure to the second structure. As a result, the thickness of the film in the blue element changes. Accompanying the change in the structure of the structure variable body, the thickness of the film changes reversibly between a first thickness in the case in which the structure variable body in the blue element has the first structure, and a second thickness in the case in which the structure variable body in the blue element has the second structure. The means for irradiating light irradiates light onto the image forming element. Thus, when the film in the blue element has the first thickness, it reflects incident light as colored interference light based on the multilayer thin-film interference theory which is the basic principle of color formation of the scaly powder of the wings of a Morpho butterfly. Namely, the light irradiated onto the film in the blue element is reflected as blue interference light. Thus, color formation of blue color occurs at the surface of the film. On the other hand, the means for applying stimulus applies a stimulus for blue element color quenching. (Hereinafter, this stimulus will be called "blue color quenching stimulus".) Thus, the structure of the structure variable body in the blue element changes from the first structure to the second structure. As a result, the thickness of the film in the blue element changes to the second thickness. When the film has the second thickness, the film reflects colorless interference light, i.e., reflects light which is other than visible light and which cannot be visually perceived. Thus, color formation (colored interference light) does not occur.

When the means for applying stimulus applies a stimulus for green element color formation (hereinafter, this stimulus will be called "green color formation stimulus"), in the same way as in the case of the blue element, the light irradiated onto the film in the green element is reflected as green interference light. Thus, color formation of green color occurs at the surface of the film. On the other hand, the means for applying stimulus applies a stimulus for green element color quenching. (Hereinafter, this stimulus will be called "green color quenching stimulus".) Thus, the thickness of the film in the green element changes to the second thickness. When the film has the second thickness, the film reflects colorless interference light, i.e., reflects light which is other than visible light and which cannot be perceived visually. Thus, color formation (colored interference light) does not occur.

When the means for applying stimulus applies a stimulus for red element color formation (hereinafter, this stimulus will be called "red color formation stimulus"), in the same way as in the case of the blue element, the light irradiated onto the film in the red element is reflected as red interference light. Thus, color formation of red color occurs at the surface of the film. On the other hand, the means for applying stimulus applies a stimulus for red element color quenching. (Hereinafter, this stimulus will be called "red color quenching stimulus".) Thus, the thickness of the film in the red element changes to the second thickness. When the film has the second thickness, the film reflects colorless interference light, i.e., reflects light which is other than visible light and which cannot be visually perceived. Thus, color formation (colored interference light) does not occur.

Thus, when the means for applying stimulus applies a blue color forming stimulus, a green color forming stimulus, and a red color quenching stimulus, at the pixel, cyan color is formed by mixing the blue interference light and the green interference light. When the means for applying stimulus applies a blue color forming stimulus, a green color quenching stimulus, and a red color forming stimulus, at the pixel, magenta color is formed by mixing of the blue interference light and the red interference light. When the means for applying stimulus applies a blue color quenching stimulus, a green color forming stimulus and a red color forming stimulus, at the pixel, yellow color is formed by mixing the green interference light and the red interference light. When the means for applying stimulus applies a blue color forming stimulus, a green color forming stimulus, and a red color forming stimulus, at the pixel, white is formed by mixing the blue interference light, the green interference light and the red interference light. When the means for applying stimulus applies a blue color quenching stimulus, a green color quenching stimulus, and a red color quenching stimulus, at the pixel, no color is formed, and the black color of the substrate is exhibited. Accordingly, at the image forming device, formation of a full color image is possible by combining these pixels.

Hereinafter, Examples of the present invention will be explained. However, the present invention is not in any way to be limited to these Examples.

EXAMPLE 1

A monomolecular film of an α-helix polypeptide was formed on a substrate, and thereon, another monomolecular film which was the same was layered, so as to form a laminated film. An image forming element of the present invention was thus prepared.

As will be described hereinafter, it was confirmed that the image forming element reflected light as colored interference light. The relationship between the colored interference light reflected and the number of layered monomolecular films of the image forming element was also investigated.

A poly(n-hexyl L-glutamate), whose monomer unit was a structure in which the hydrogen atom of the carboxyl group of the glutamic acid was substituted by an n-hexyl group (hereinafter this compound is called "PHeLG" upon occasion), was used as the α-helix polypeptide. This PHeLG was obtained by a polymerization reaction of L-glutamic acid.γ-methylester using benzyl amine as a polymerization initiator. The degree of polymerization was 114 as measured by $^1$H-NMR measurement. The substrate was a silicon substrate (manufactured by Shin-Etsu Chemical Co., Ltd.) which was subjected to a surface treatment by using octadecyl trimethoxysilane (manufactured by Tokyo Kasei Kogyo Co., Ltd.). The molecular film was formed by using an LB film forming device (NL-LB400NK-MWC manufactured by Nippon Laser & Electronics Laboratory, Co.). In the PHeLG, the pitch of the spiral of the α-helix was 0.15 (nm/amino acid residue), and the diameter of the α-helix was 1.5 (nm).

When the FT-IR spectrum of a laminated film in which 120 of the molecular films were laminated was measured, four peaks were obtained. One was a peak of 1738 cm$^{-1}$ based on the C=O group of the side chain. Another was a strong peak of 1656 cm$^{<1}$ based on the amide group I in the α-helix structure. Yet another was a small, weak peak of 1626 cm$^{-1}$ based on the amide group I in the β-structure. The last was a peak of 1551 cm$^{-1}$ based on the amide group II in the α-helix structure. From these results of measurement of the FT-IR spectrum, it was confirmed that the PHeLG molecule maintains its α-helix structure in the monomolecular film.

The thickness of a laminated film when 20 monomolecular films formed by PHeLG were laminated was 32 mm. Thus, the thickness of each monomolecular film formed by PHeLG (i.e., each layer) was 1.6 nm.

Figure 11:
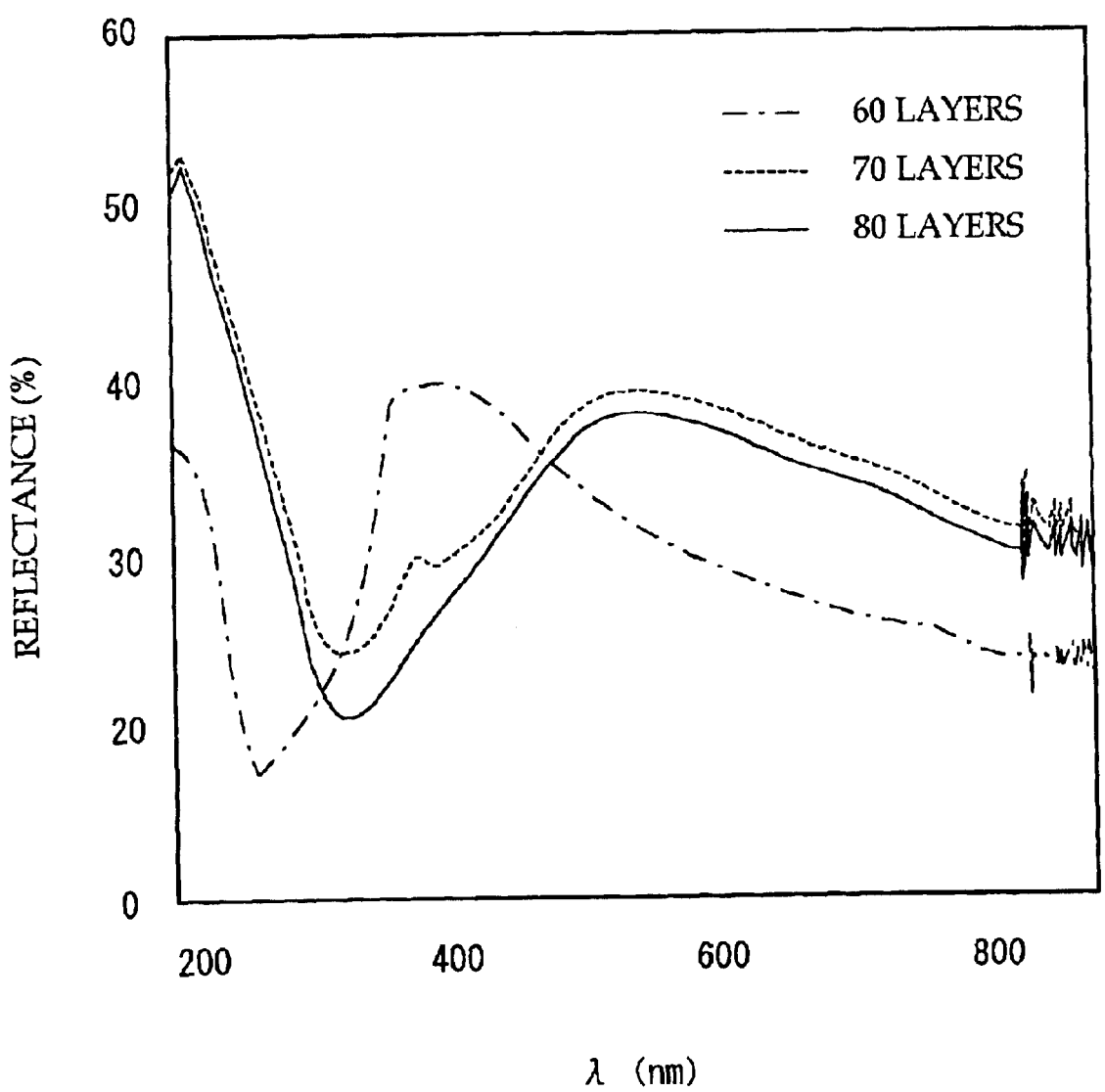
FIG. 11 is a graph showing the relationship between wavelengths of reflection of incident light as colored interference light by laminated films (60 layers, 70 layers, 80 layers), in which monomolecular films of the rod-shaped bodies are laminated, and thicknesses of the laminated films.

Next, the relationship between the number of layers in the laminated film formed by the monomolecular films and the colored interference light reflection was investigated. Laminated films formed by layering 60, 70 and 80 monomolecular films, respectively, exhibited the visible light reflection spectra shown in FIG. 11. Further, a laminated film in which 40 to 50 monomolecular films were layered reflected light as colored interference light of brown color. A laminated film in which 60 to 70 monomolecular films were layered exhibited dark blue (a deep blue). A laminated film in which 80 to 100 monomolecular films were layered exhibited light blue (a weak blue). A laminated film in which up to around 120 monomolecular films were layered exhibited yellow color. A laminated film in which up to 160 monomolecular films were layered exhibited red-violet.

Figure 12:
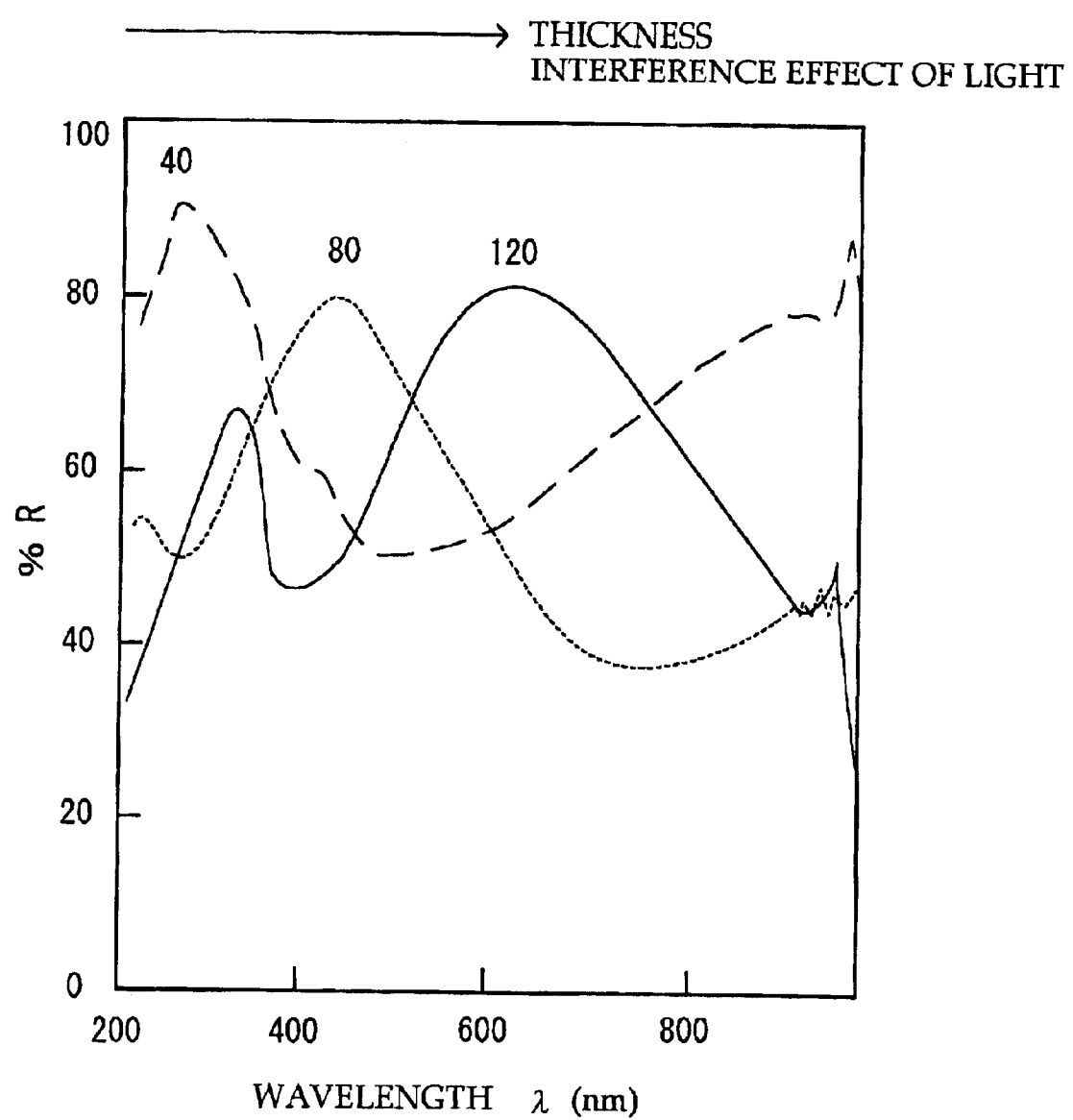
FIG. 12 is a graph showing the relationship between wavelengths of reflection of incident light as colored interference light by laminated films (40 layers, 80 layers, 120 layers), in which monomolecular films of the rod-shaped bodies are laminated, and thicknesses of the laminated films.

Specifically, the visible light reflection spectra of a laminated film in which 40 monomolecular films were layered, a laminated film in which 80 monomolecular films were layered, and a laminated film in which 120 monomolecular films were layered, are shown in FIG. 12. As can be seen from FIG. 12, the reflectance (%) of the laminated film in which 80 films were layered exhibited a maximum peak at 418 nm, and this laminated film became blue. Further, the reflectance (%) of the laminated film in which 40 films were layered exhibited a minimum at 456 nm, and this laminated film became brown (dark orange) which is a complementary color of blue. The reflectance (%) of the laminated film in which 120 films were layered exhibited a maximum peak at 619 nm, the reflectance (%) exhibited a minimum at 409 nm, and the laminated film became yellow color based on the emphasized light of 619 nm rather than the enfeebled light of a wavelength of 409 nm.

The wavelength ($\lambda$) of the visible light reflection spectrum was affected by the angle of incidence ($\alpha$) of the light onto the laminated film formed by the monomolecular films. The condition under which the wavelength ($\lambda$) was emphasized is as per following (1), and the condition under which the wavelength ($\lambda$) was enfeebled is as per following (2).

$$\lambda = \frac{2tl}{m}\sqrt{n^2 - \sin^2\alpha} \quad (1)$$

$$\lambda = \frac{4tl}{2m-1}\sqrt{n^2 - \sin^2\alpha} \quad (2)$$

In above formula (1) and above formula (2), $\lambda$ is the wavelength (nm) of the interference light, $\alpha$ is the angle of incidence (°) of light onto the monomolecular film or the laminated film, t is the thickness (nm) of the monomolecular film, l is the number of monomolecular films, n is the refractive index of the monomolecular film, and m is an integer of 1 or more.

Figure 13:
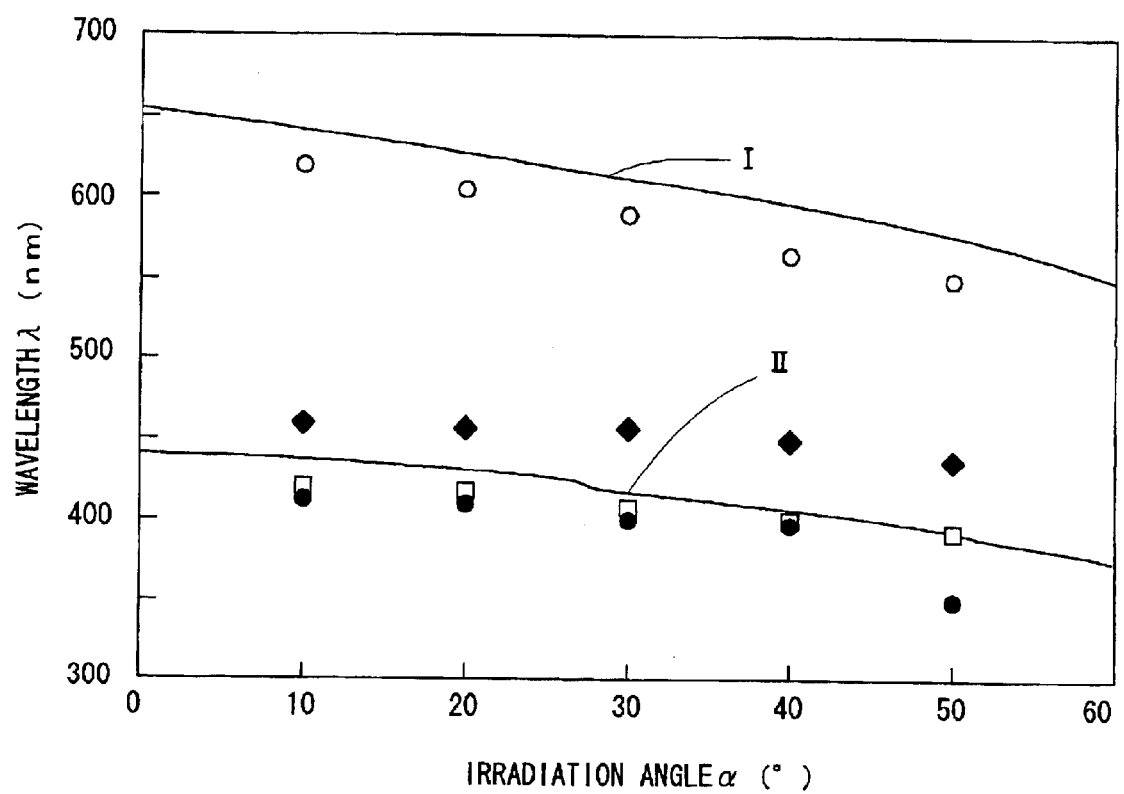
FIG. 13 is a graph showing the relationship between angles of incidence $\alpha$ (°) of light on laminated films (40 layers, 80 layers, 120 layers), in which monomolecular films of the rod-shaped bodies are laminated, and reflection wavelengths $\lambda$ (nm).

The relationship between the wavelength ($\lambda$) of the visible light reflection spectrum and the angle of incidence ($\alpha$) of the light onto the laminated film formed by the monomolecular films was investigated and found to be as shown in FIG. 13. As shown in FIG. 13, the actual measured values of the wavelengths ($\lambda$) of 5 reflection spectra for five angles of incidence ($\alpha$), and the wavelengths ($\lambda$s) computed by using above formulas (1) and (2) substantially coincided.

Note that, in FIG. 13, "♦" denotes the minimum spectrum of a laminated film in which 40 films were layered, "□" denotes the maximum spectrum of a laminated film in which 80 films were layered, "○" denotes the maximum spectrum of a laminated film in which 120 films were layered, and "●" denotes the minimum spectrum of the laminated film in which 120 films were layered. Further, line I is the results of computation by formula (1) with l=120 and m 1. Line II is the results of computation by formula (1) with l=80 and m=1, or by formula (2) with l=40 and m=1, or by formula (2) with l=120 and m=2. In all cases, t=1.7 (nm) and n=1.6. (The lines of the three types of results of computation substantially overlap one another.)

From the above results, it can be understood that, when the image forming element of Example 1 was used, a color image could be formed.

EXAMPLE 2

First, $\alpha$-helix copolypeptide $PLLZ_{25}\text{-}P(MLG_{42}/LGA_{18})$ was prepared as follows as the $\alpha$-helix polypeptide which was the rod-shaped body. Namely, the polymerization of $N^\epsilon$-carbobenzoxy L-lysine $N^\alpha$-carboxy acid anhydride (LLZ-NCA) was carried out by using n-hexylamine as an initiator. Next, by polymerizing $\gamma$-methyl L-glutamate N-carboxy acid anhydride (MLG-NCA), a block copolypeptide $PLLZ_x\text{-}PMLG_y$, in which the degree of polymerization of the PLLZ portion was x and the degree of polymerization of the PMLG portion was y, was prepared. Thereafter, the PMLG segment was partially hydrolysized and made to be L-glutamic acid (LGA), such that $\alpha$-helix copolypeptide $PLLZ_x\text{-}P(MLG_y/LGA_z)$ was prepared.

Then, azobenzene compound was bonded to one end of the $\alpha$-helix copolypeptide $PLLZ_x\text{-}P(MLG_y/LGA_z)$, and this azobenzene compound was fixed to the substrate used in Example 1. A plurality of these structures were oriented such that a molecular film was formed. An image forming element was thereby prepared.

Three types of image forming elements were obtained whose degrees of polymerization of the $\alpha$-helix copolypeptide were set in the range of 260 to 5400, and the obtained image forming elements had three types of thicknesses. One type of image forming element was an image forming element (hereinafter "blue element") in which the color of the interference light when the azobenzene compound had a trans structure was blue (the wavelength of the interference light was about 400 nm or more to less than 500 nm), and in which the color of the interference light when the azobenzene compound had a cis structure was colorless (the wavelength of the interference light was other than 300 to 810 nm). Another type was an image forming element (hereinafter "green element") in which the color of the interference light when the azobenzene compound had a trans structure was green (the wavelength of the interference light was about 500 nm or more to less than 600 nm), and in which the color of the interference light when the azobenzene compound had a cis structure was colorless (the wavelength of the interference light was other than 300 to 810 nm). The final type was an image forming element (hereinafter "red element") in which the color of the interference light when the azobenzene compound had a trans structure was red (the wavelength of the interference light was about 600 nm or more to less than 700 nm), and in which the color of the interference light when the azobenzene compound had a cis structure was colorless (the wavelength of the interference light was other than 300 to 810 nm).

The image forming device of Example 2 had a plurality of pixels having the above-described blue elements, green elements and red elements. Further, the image forming device was equipped with, as the means for irradiating light, a light source which irradiated visible light onto these elements, and, as a means for applying stimulus, a light source (stimulus applying light source) which switchably irradiated visible light and ultraviolet light onto the azobenzene compound in these elements. Note that these two light sources were designed such that the driving thereof could be controlled by a computer.

In the image forming device, the stimulus applying light source irradiated visible light as the blue color forming stimulus. Thus, the azobenzene compound in the blue element changed to a trans structure. As a result, the thickness of the film in the blue element changed. Accompanying the changes of the azobenzene compound between the trans structure and the cis structure, the thickness of the film changes reversibly between two thicknesses which are a thickness in the case in which the azobenzene compound in the blue element is a trans structure and the thickness when the azobenzene compound is a cis structure. The light source irradiated visible light onto the blue element. Thus, at the time when the thickness of the film in the blue element was the thickness in the case in which the azobenzene compound was the trans structure, blue interference light was reflected from the film. Thus, blue color formation (blue interference light) occurred at the surface of the film. On the other hand, when the stimulus applying light source irradiated ultraviolet light as the blue color quenching stimulus, the azobenzene compound in the blue element changed from a trans structure to a cis structure. As a result, the thickness of the film in the blue element changed to the thickness at the time when the azobenzene compound is a cis structure. At the time when the thickness of the film was the thickness in the case in which the azobenzene compound was the cis structure, the film reflected colorless interference light. Namely, light other than visible light was reflected, and thus, reflection of incident light as colored interference light did not occur.

When the stimulus applying light source irradiated visible light as the green color forming stimulus, in the same way as in the case of the blue element, the light irradiated onto the film in the green element was reflected as green interference light. Thus, green color formation (green interference light) occurred at the surface of the film. On the other hand, when the stimulus applying light source irradiated ultraviolet light as the green color quenching stimulus, the thickness of the film in the green element changed to the thickness in the case in which the azobenzene compound was a cis structure. In this case, because the film reflected colorless interference light, i.e., because light other than visible light was reflected, the reflection of incident light as colored interference light did not occur.

When the stimulus applying light source irradiated visible light as the red color forming stimulus, in the same way as in the case of the blue element, the light irradiated onto the film in the red element was reflected as red interference light. Thus, red color formation (red interference light) occurred at the surface of the film. On the other hand, when the stimulus applying light source irradiated ultraviolet light as the red color quenching stimulus, the thickness of the film in the red element changed to the thickness in the case in which the azobenzene compound was a cis structure. In this case, because the film reflected colorless interference light, i.e., because light other than visible light was reflected, color formation (colored interference light) did not occur.

In the image forming device, it was confirmed that when the stimulus applying light source applied the blue color forming stimulus, the green color forming stimulus, and the red color quenching stimulus, and the light source irradiated visible light onto the pixel, at the pixel, cyan color was formed by mixing the blue interference light and the green interference light.

In the image forming device, it was confirmed that when the stimulus applying light source applied the blue color forming stimulus, the green color quenching stimulus, and the red color forming stimulus, and the light source irradiated visible light onto the pixel, at the pixel, magenta color was formed by mixing the blue interference light and the red interference light.

In the image forming device, it was confirmed that when the stimulus applying light source applied the blue color quenching stimulus, the green color forming stimulus, and the red color forming stimulus, and the light source irradiated visible light onto the pixel, at the pixel, yellow color was by mixing the green interference light and the red interference light.

When color formation control of these pixels was carried out simultaneously, a full color image could be formed.

What is claimed is:

1. An image forming device comprising:
    an image forming element;
    means for irradiating light onto the image forming element; and
    means for applying a stimulus to a structure variable body whose structure can be changed by a stimulus;
    wherein the image forming element comprises a film in which rod-shaped bodies are oriented and have said structure variable body bonded to at least one of an end portion and a peripheral side surface thereof, and which reflects, as interference light, a light irradiated by the means for irradiating, and the interference light has a wavelength of 300 to 810 nm,
    wherein the image forming device has a plurality of pixels which have at least:
    an image forming element for reflecting incident light as blue interference light in a case in which the structure variable body has a first structure and for reflecting incident light as colorless interference light in a case in which the structure variable body has a second structure,
    an image forming element for reflecting incident light as green interference light in a case in which the structure variable body has a first structure and for reflecting incident light as colorless interference light in a case in which the structure variable body has a second structure, and
    an image forming element for reflecting incident light as red interference light in a case in which the structure variable body has a first structure and for reflecting incident light as colorless interference light in a case in which the structure variable body has a second structure.

2. An image forming device according to claim 1, wherein the thickness of the film is 810 nm or less.

3. An image forming device according to claim 1, wherein the rod-shaped bodies are rod-shaped organic molecules, and the film is one of a monomolecular film of the rod-shaped organic molecules, and a laminated film of the monomolecular film.

4. An image forming device according to claim 1, wherein interference light reflected by the film is emphasized by the condition of following formula (1), and is enfeebled by the condition of following formula (2):

$$\lambda = \frac{2tl}{m}\sqrt{n^2 - \sin^2\alpha} \quad (1)$$

$$\lambda = \frac{4tl}{2m-1}\sqrt{n^2 - \sin^2\alpha} \quad (2)$$

wherein in formula (1) and formula (2), $\lambda$ is the wavelength (nm) of the interference light, $\alpha$ is the angle of incidence (°) of light onto the film, t is the thickness (nm) of the film, l is the number of laminated layers of the film, n is the refractive index of the film, and m is an integer of 1 or more.

5. An image forming device according to claim 1, wherein the film is fixed to a substrate.

6. An image forming device according to claim 1, wherein the rod-shaped bodies are α-helix polypeptides.

7. An image forming device according to claim 1, wherein a structure variable body, whose structure can be changed by a stimulus, is bonded to at least one of an end portion and a peripheral side surface of the rod-shaped body.

8. An image forming device according to claim 7, wherein when the structure of the structure variable body changes, the color of the colored interference light changes.

9. An image forming device according to claim 7, wherein the structure of the structure variable body can be changed by any of light, heat, and an electrical field.

10. An image forming device according to claim 9, wherein the structure variable body is selected from the group consisting of a geometrical isomer, a thermoplastic substance, a thermosetting substance, and a liquid crystalline molecule.

11. An image forming device according to claim 10, wherein the structure variable body is an azobenzene compound.

* * * * *